United States Patent
Fukata et al.

(10) Patent No.: US 9,558,556 B2
(45) Date of Patent: Jan. 31, 2017

(54) THREE-DIMENSIONAL OBJECT DETECTION DEVICE

(71) Applicant: Nissan Motor Co., Ltd., Yokohama-shi, Kanagawa (JP)

(72) Inventors: Osamu Fukata, Sagamihara (JP); Yasuhisa Hayakawa, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 173 days.

(21) Appl. No.: 14/373,044

(22) PCT Filed: Feb. 13, 2013

(86) PCT No.: PCT/JP2013/053328
§ 371 (c)(1),
(2) Date: Jul. 18, 2014

(87) PCT Pub. No.: WO2013/125404
PCT Pub. Date: Aug. 29, 2013

(65) Prior Publication Data
US 2015/0302586 A1    Oct. 22, 2015

(30) Foreign Application Priority Data
Feb. 23, 2012  (JP) ............... 2012-037482

(51) Int. Cl.
*G06K 9/00*   (2006.01)
*G06T 7/00*   (2006.01)
(Continued)

(52) U.S. Cl.
CPC ........ *G06T 7/0042* (2013.01); *G06K 9/00201* (2013.01); *G06K 9/00791* (2013.01);
(Continued)

(58) Field of Classification Search
None
See application file for complete search history.

(56) References Cited

U.S. PATENT DOCUMENTS

| | | | |
|---|---|---|---|
| 2007/0021915 A1* | 1/2007 | Breed | B60N 2/2863 701/301 |
| 2009/0187321 A1* | 7/2009 | Otsuka | B60R 21/0134 701/70 |
| 2011/0310245 A1* | 12/2011 | Tsuchiya | G01S 11/12 348/135 |

FOREIGN PATENT DOCUMENTS

| | | |
|---|---|---|
| CN | 102288165 A | 12/2011 |
| EP | 1964719 A2 | 9/2008 |

(Continued)

OTHER PUBLICATIONS

Chin-Teng Lin et al, "Construction of Fisheye Lens Inverse Perspective Mapping Model and Its Applications of Obstacle Detection," EURASIP Journal on Advances in Signal Processing, Jun. 15, 2010, vol. 1, No. 3, 2010, Hindawi Publishing Corporation, New York, NY.

*Primary Examiner* — Weiwen Yang
(74) *Attorney, Agent, or Firm* — Global IP Counselors, LLP

(57) ABSTRACT

A three-dimensional object detection device includes an image capturing unit, a detection area setting unit, an image conversion unit, a three-dimensional object detection unit, and a relative movement speed calculation unit. The detection area setting unit sets a detection area in a lateral direction rearward of the host vehicle. The image conversion unit converts a viewpoint of the images obtained by the image capturing unit to create bird's-eye view images. The three-dimensional object detection unit detects a presence of a three-dimensional object within the detection area by vehicle width direction detection processing. The detection (Continued)

area setting unit widens the detection area rearward with respect to a direction of vehicle progress when the three-dimensional object is detected in the detection area and the relative movement speed of the three-dimensional object, as calculated by relative movement speed calculation unit, is at a predetermined value or greater.

24 Claims, 23 Drawing Sheets

(51) Int. Cl.
 *G08G 1/16* (2006.01)
 *G06T 1/00* (2006.01)
 *G06T 3/00* (2006.01)
(52) U.S. Cl.
 CPC ..... *G06K 9/00798* (2013.01); *G06K 9/00805* (2013.01); *G06T 1/0007* (2013.01); *G06T 3/005* (2013.01); *G06T 7/0038* (2013.01); *G08G 1/165* (2013.01); *G08G 1/166* (2013.01); *G08G 1/167* (2013.01); *G06K 2209/21* (2013.01); *G06T 2207/10004* (2013.01); *G06T 2207/10152* (2013.01); *G06T 2207/30236* (2013.01); *G06T 2207/30261* (2013.01)

(56) References Cited

FOREIGN PATENT DOCUMENTS

| | | |
|---|---|---|
| EP | 2400315 A1 | 12/2011 |
| JP | 9-18863 A | 1/1997 |
| JP | 2002-298299 A | 10/2002 |
| JP | 2003-306102 A | 10/2003 |
| JP | 2008-219063 A | 9/2008 |
| JP | 2008-227646 A | 9/2008 |
| JP | 2010-238053 A | 10/2010 |
| JP | 2012-3662 A | 1/2012 |

* cited by examiner

THREE-DIMENSIONAL OBJECT DETECTION DEVICE

CROSS-REFERENCE TO RELATED APPLICATIONS

This application is a U.S. National stage application of International Application No. PCT/JP2013/053328, filed Feb. 13, 2013, which claims priority to Japanese Patent Application No. 2012-037482 filed in Japan on Feb. 23, 2012. The entire disclosure of Japanese Patent Application No. 2012-037482 is hereby incorporated herein by reference.

BACKGROUND

Field of the Invention

The present invention relates to a three-dimensional object detection device.

Background Information

In a conventionally known technique, two captured images captured at different times are converted to a bird's-eye view image, and an obstacle is detected based on differences in the two converted bird's-eye view images (see Japanese Laid-Open Patent Application No. 2008-227646).

SUMMARY

When a three-dimensional object present in a detection area is to be detected based on a captured image in which the rearward of a host vehicle has been captured, there may be cases in which two adjacent vehicles (three-dimensional objects) traveling in an adjacent lane, which is adjacent to the lane in which the host vehicle is traveling, are traveling in consecutive fashion, and when the host vehicle is passed by the leading adjacent vehicle of the two consecutive adjacent vehicles, the first adjacent vehicle is no longer detected in the detection area and the driver may therefore determine that an adjacent vehicle (three-dimensional object) is not present behind the host vehicle, regardless of the fact that the second adjacent vehicle is present behind the host vehicle.

The problem to be solved by the present invention is to provide a three-dimensional object detection device that is capable of suitably detecting two adjacent vehicles when the two adjacent vehicles are traveling in consecutive fashion.

The present invention solves the problem by widening the detection area rearward with respect to the direction of vehicle progress when a three-dimensional object is detected in the detection area and the relative movement speed of the three-dimensional object is at a predetermined value or greater.

In accordance with the present invention, when two adjacent vehicles traveling in an adjacent lane are traveling in consecutive fashion, and the leading first adjacent vehicle (three-dimensional object) has been detected and the relative movement speed of the first adjacent vehicle is at a predetermined value or greater, it is determined that the host vehicle has been passed by the first adjacent vehicle and the detection areas rearward with respect to the direction of vehicle progress are widened, whereby the second adjacent vehicle following the first adjacent vehicle can be suitably detected.

BRIEF DESCRIPTION OF THE DRAWINGS

Referring now to the attached drawings which form a part of this original disclosure.

DETAILED DESCRIPTION OF THE EMBODIMENTS

Figure 1:
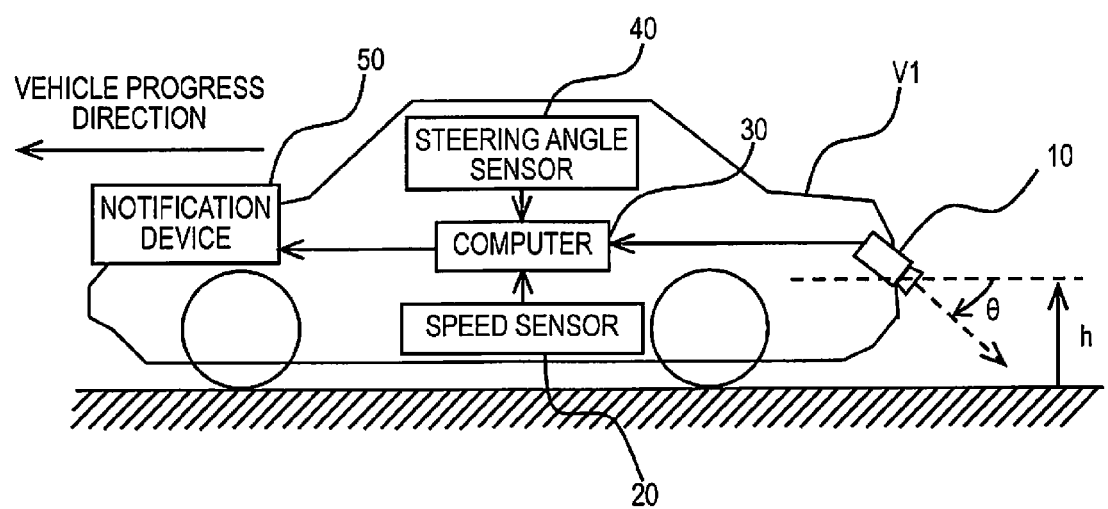
FIG. 1 is a schematic structural diagram of a vehicle in which a three-dimensional object detection device according to the first embodiment has been mounted.

FIG. 1 is a schematic structural diagram of a vehicle in which a three-dimensional object detection device according to the first embodiment has been mounted. An object of the three-dimensional object detection device 1 according to the present embodiment is to detect another vehicle (may hereinbelow be referred to as "adjacent vehicle") present in an adjacent lane where contact is possible should a host vehicle V1 change lanes. The three-dimensional object detection device 1 according to the present embodiment is provided with a camera 10, a speed sensor 20, a computer 30, a steering angle sensor 40, and a notification device 50, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle. The steering angle sensor 40 is an angle sensor attached near the steering column or the steering wheel and detects the rotational angle of the steering shaft as the steering angle. The steering angle information detected by the steering angle sensor 40 is transmitted to the computer 30. The notification device 50 provides a warning to the driver that an adjacent vehicle is present when, as a result of detecting an adjacent vehicle carried out by the computer 30, a adjacent vehicle is present rearward of the host vehicle. The notification device 50 is not particularly limited, but examples included a speaker for outputting an audio warning to the driver, a display for displaying a warning message, and a warning light that provides warning by lighting inside the instrument panel.

Figure 2:
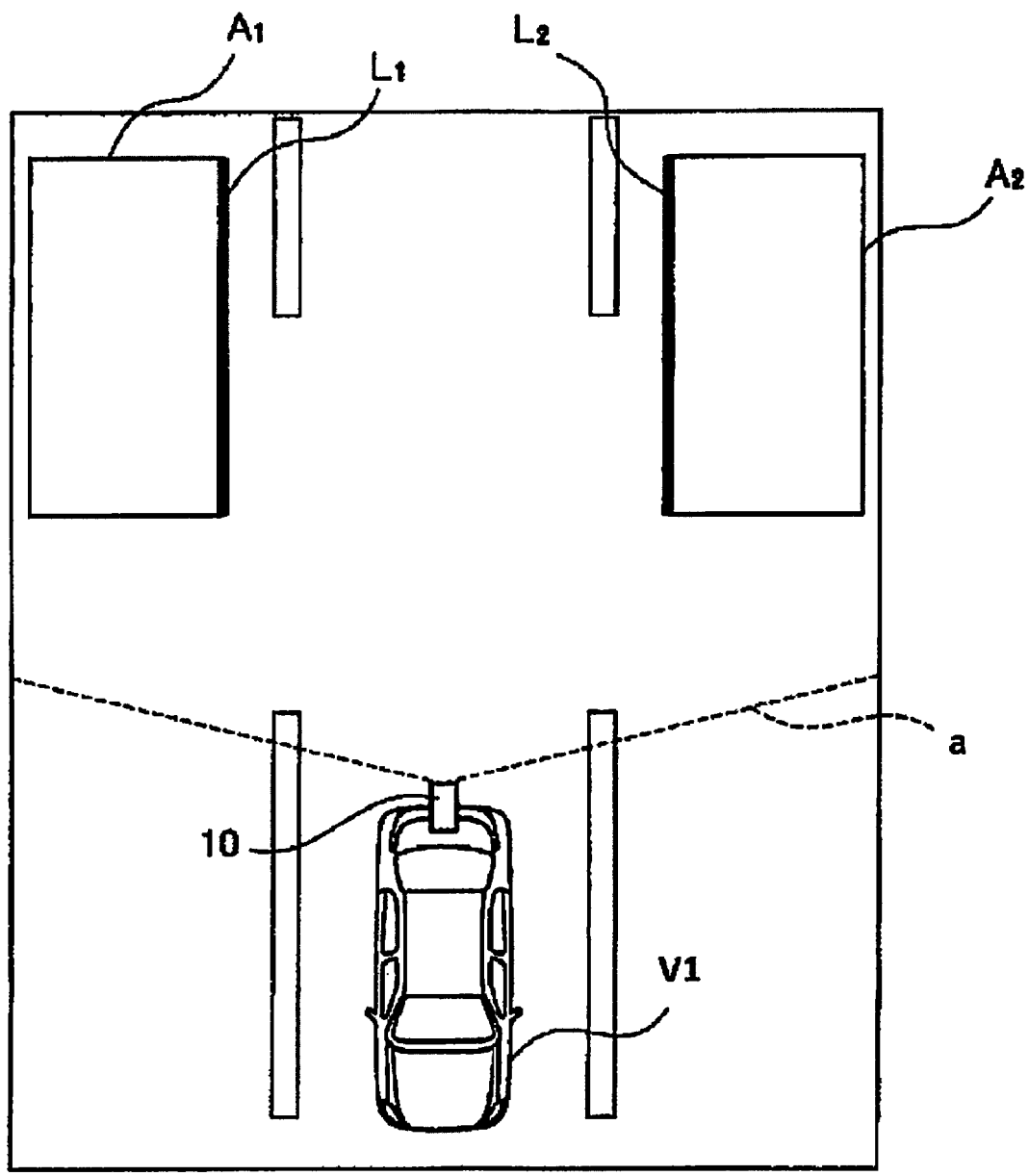
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
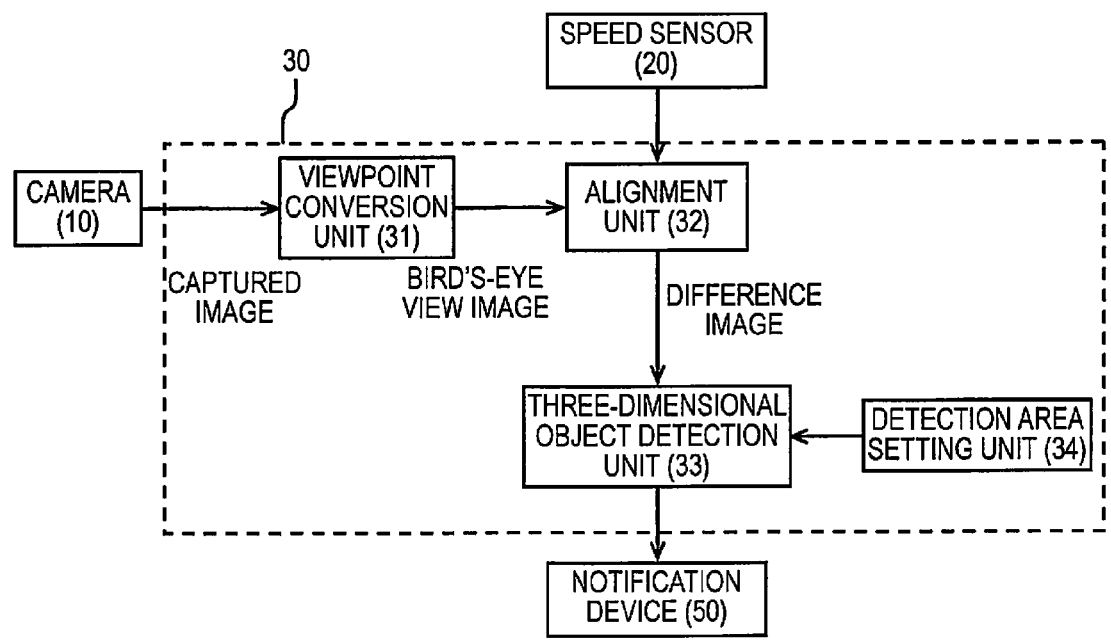
FIG. 3 is a block diagram illustrating the details of the computer according to the first embodiment.

FIG. 3 is a block view illustrating the details of the computer 30 in FIG. 1. The camera 10, the speed sensor 20, the steering angle sensor 40, and the notification device 50 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, and a detection area setting unit 34. The configurations of these units are described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight line group that passes through specific fixed point by viewpoint conversion to bird's-eye view image data, and utilizing this principle allows a planar object and a three-dimensional object to be differentiated.

Figure 4:
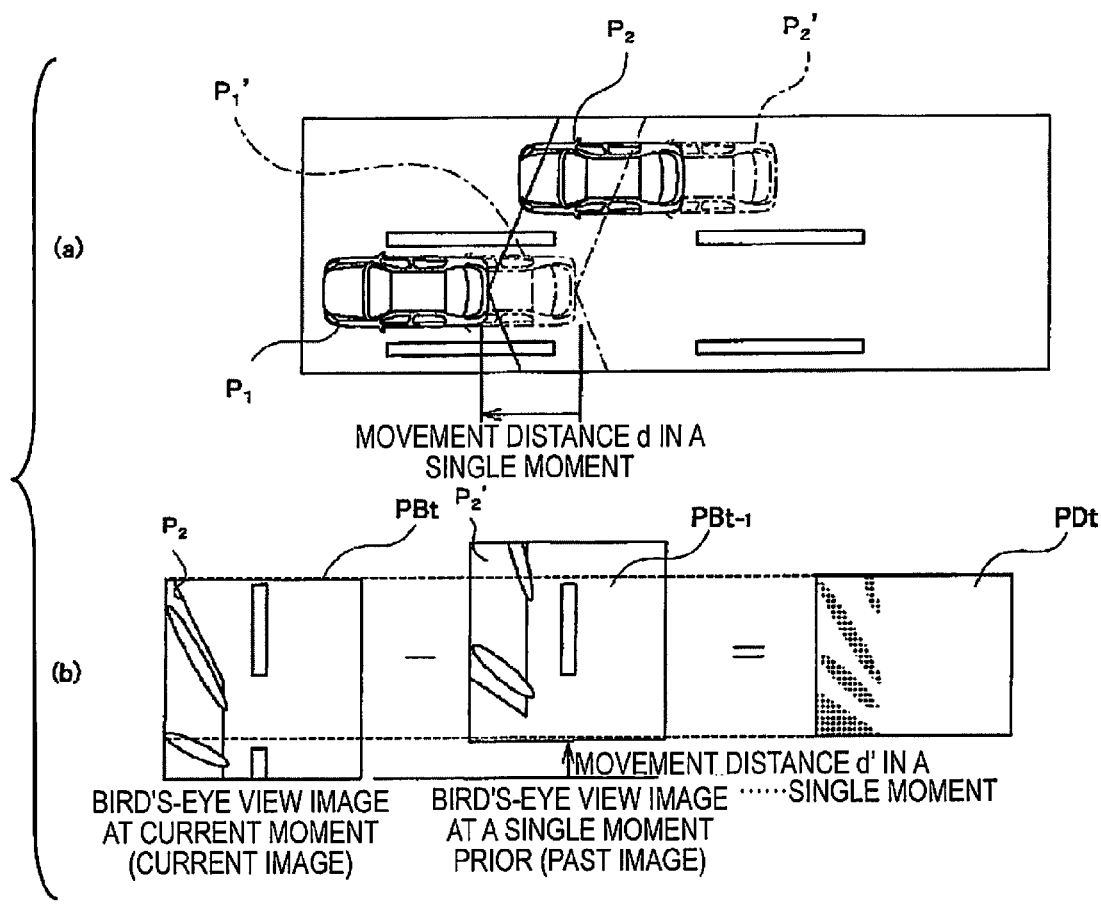
FIG. 4 is a view for describing the general overview of the processing of the alignment unit according to the first embodiment, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) illustrating the movement state of the host vehicle V1 from a top plan view, and part (b) illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in actual space. The three-dimensional object detection unit 33 first generates a difference waveform when the three-dimensional object is detected and the movement distance is to be calculated.

Specifically, the three-dimensional object detection unit 33 generates a difference waveform in the detection areas set by the later-described detection area setting unit 34. The purpose of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set to the rearward side of the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques. The method for setting the detection areas as carried out by the detection area setting unit 34 is later described.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
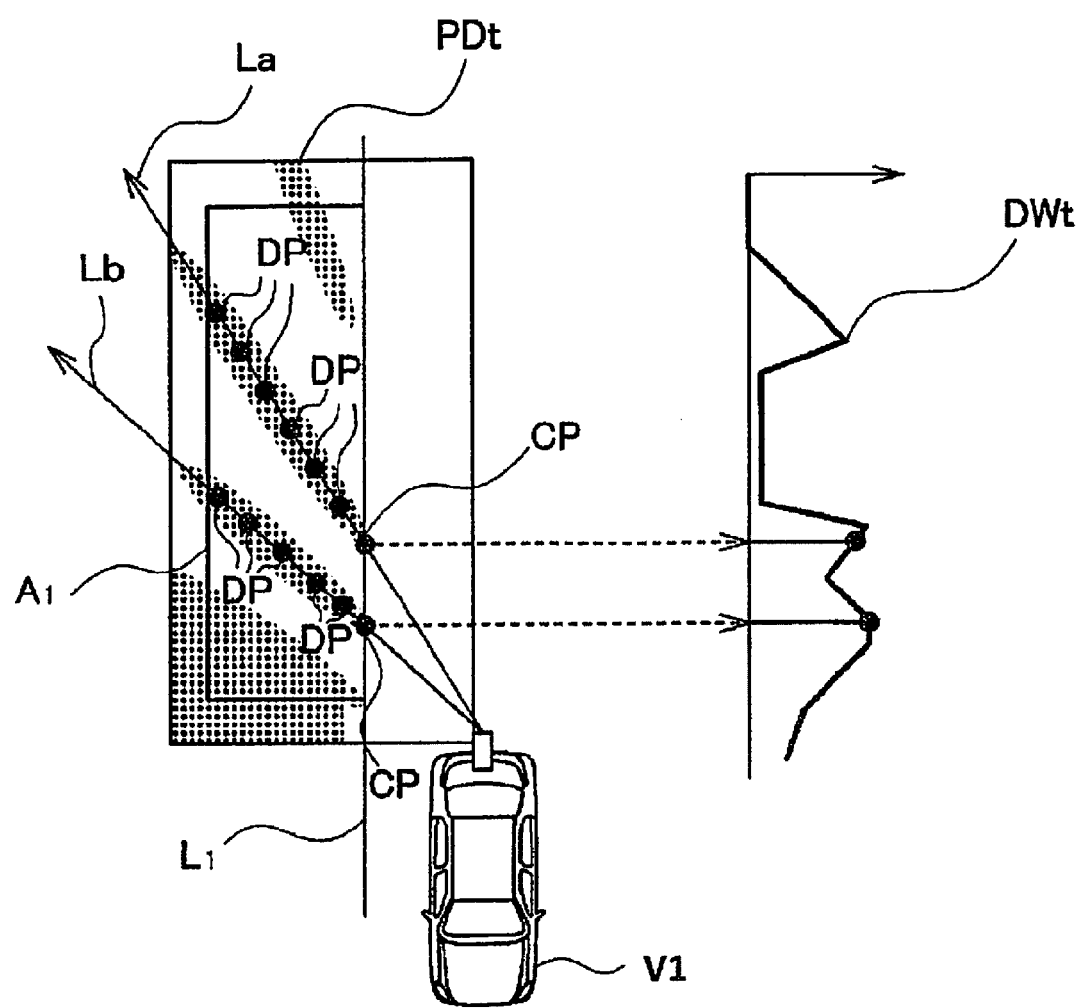
FIG. 5 is a schematic view illustrating the manner in which the difference waveform is generated by the three-dimensional object detection unit according to the first embodiment.

FIG. 5 is a schematic view illustrating the manner in which the difference waveform is generated by the three-dimensional object detection unit 33. As illustrated in FIG. 5, the three-dimensional object detection unit 33 generates a difference waveform $DW_t$ from the portion that corresponds to the detection areas A1, A2 in the difference image $PD_t$ (drawing on the right in part (b) of FIG. 4) calculated by the alignment unit 32. In this case, the three-dimensional object detection unit 33 generates a difference waveform $DW_t$ along the collapsing direction of the three-dimensional object by viewpoint conversion. In the example illustrated in FIG. 5, only the detection area A1 will be described for the sake of convenience, but the difference waveform $DW_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a first difference waveform $DW1_t$ as illustrated in the drawing on the right in FIG. 5.

Here, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a difference waveform $DW_t$. In particular, the number of pixels is counted along direction in which the three-dimensional object collapses, and a difference waveform $DW_t$ is therefore generated from information about the height direction in relation to the three-dimensional object.

Thus, the difference waveform $DW_t$ is one mode of pixel distribution information that show a predetermined luminance difference, and the "pixel distribution information" in the present embodiment can be aligned with information indicating the state of distribution of "pixels having a luminance difference at a predetermined threshold value or greater" as detected along the direction in which the three-dimensional object collapses when the captured image is converted in viewpoint to a bird's-eye view image. In other words, in a bird's-eye view image obtained by the viewpoint conversion unit 31, the three-dimensional object detection unit 33 detects a three-dimensional object based on the pixel distribution information having a luminance difference at a predetermined threshold value or greater along the direction in which the three-dimensional object collapses when the captured image is converted in viewpoint to a bird's-eye view image.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the difference waveform $DW_t$ that correspond to the lines La, Lb in the direction in which the three-dimensional object collapses are thereby made substantially the same.

After the first difference waveform $DW_t$ has been generated, the three-dimensional object detection unit 33 detects an adjacent vehicle present in an adjacent lane based on the generated difference waveform $DW_t$. The three-dimensional object detection unit 33 calculates the movement distance by comparing the difference waveform $DW_t$ at the current moment and the difference waveform $DW_{t-1}$ at a single moment prior. In other words, the three-dimensional object detection unit 33 calculates the movement distance from the change in time of the difference waveform $DW_t$ and the difference waveform $DW_{t-1}$.

Figure 6:
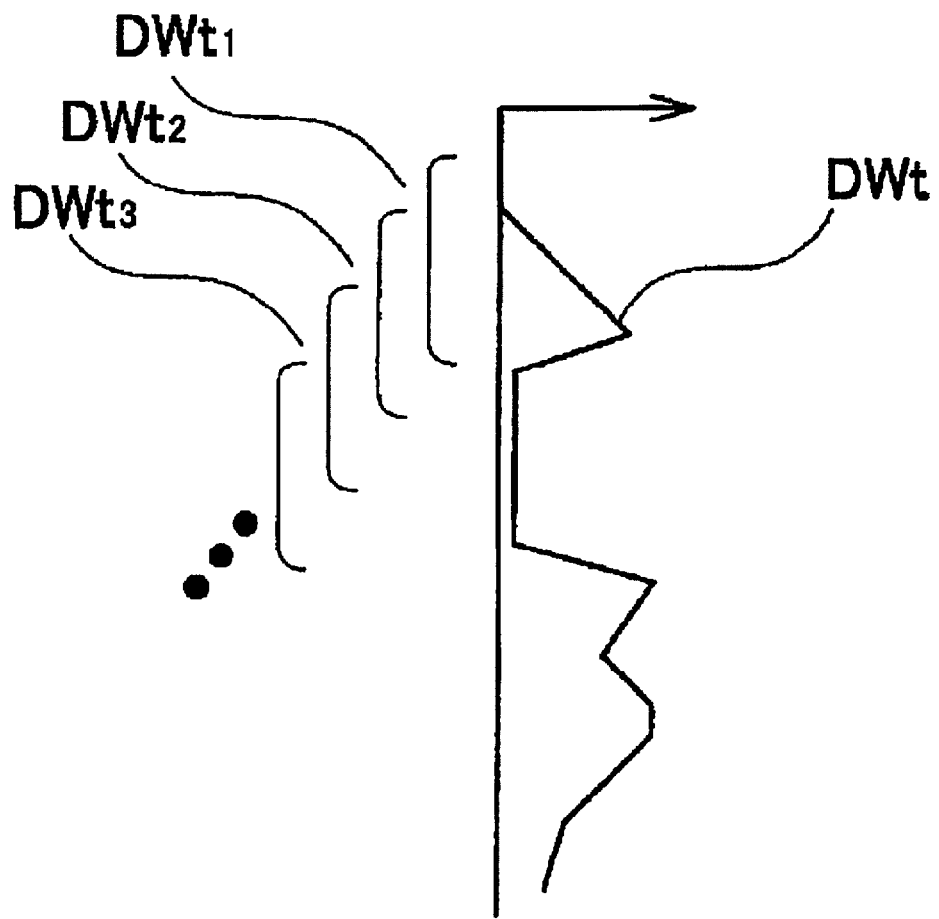
FIG. 6 is a view illustrating the small areas divided by the three-dimensional object detection unit according to the first embodiment.

More specifically, the three-dimensional object detection unit 33 divides the difference waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, e.g., FIG. 6. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 6) of the difference waveform) for each of the small areas $DW_{t1}$ to $DW_{tn}$. Here, the offset amount is determined from the difference (distance in the horizontal-axis direction) between the difference waveform $DW_{t-1}$ at a single moment prior and the difference waveform $DW_t$ at the current moment. In this case, the three-dimensional object detection unit 33 moves the difference waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the difference waveform $DW_t$ at the current moment is at a minimum, and determines as the offset amount the movement amount in the horizontal-axis direction at the position in which the error from the original position of the difference waveform $DW_{t-1}$ is at a minimum. The three-dimensional object detection unit 33 then counts the offset amount determined for each of the small areas $DW_{t1}$ to $DW_{tn}$ and forms a histogram.

Figure 7:
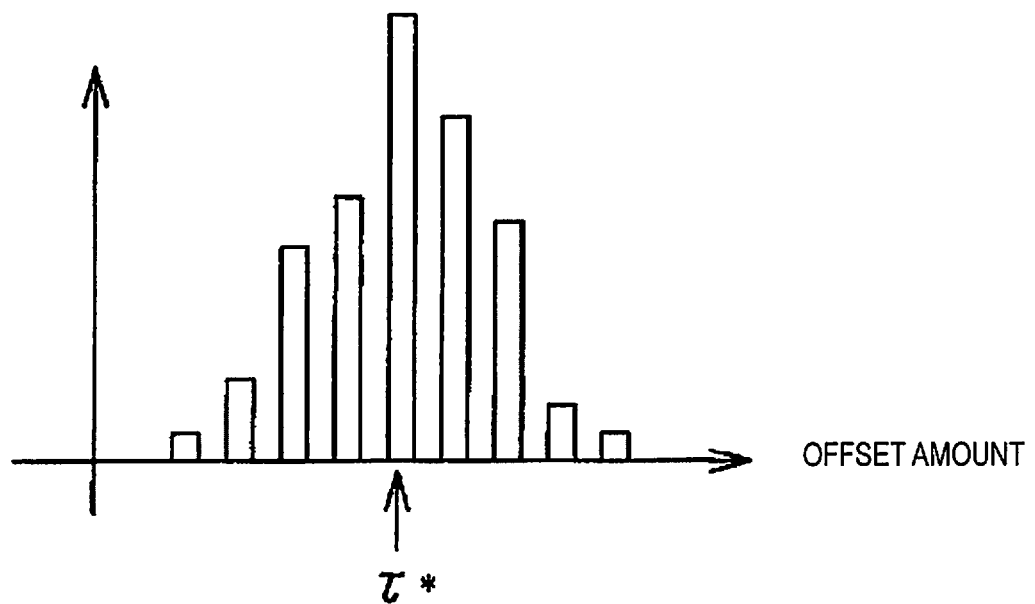
FIG. 7 is a view illustrating an example of the histogram obtained by the three-dimensional object detection unit according to the first embodiment.

FIG. 7 is a view illustrating an example of the histogram obtained by the three-dimensional object detection unit 33. As illustrated in FIG. 7, some amount of variability occurs in the offset amount, which is the movement distance in which the error between the small areas $DW_{t1}$ to $DW_{tn}$ and the difference waveform $DW_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 7, the three-dimensional object detection unit 33 calculates the offset amount indicating the maximum value of the histogram as the movement distance $\tau^*$. In this manner, in the present embodiment, a more highly accurate movement distance can be calculated from the maximum value, even when there is variability in the offset amount. The movement distance $\tau^*$ is the relative movement distance of the three-dimensional object in relation to the host vehicle. Accordingly, the three-dimensional object detection unit 33 calculates the absolute movement distance from the movement distance $\tau^*$ thus obtained and the speed sensor 20 when the absolute movement distance is to be calculated.

In this manner, in the present embodiment, the movement distance of the three-dimensional object is calculated from the offset amount of the difference waveform $DW_t$ when the error in the difference waveform $DW_t$ generated at different moments is at a minimum, and this allows the movement distance to be calculated from the offset amount, which is information about one dimension in a waveform, and allows computation cost to be kept low when the movement distance is calculated. Also, dividing the difference waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the difference waveform $DW_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 8:
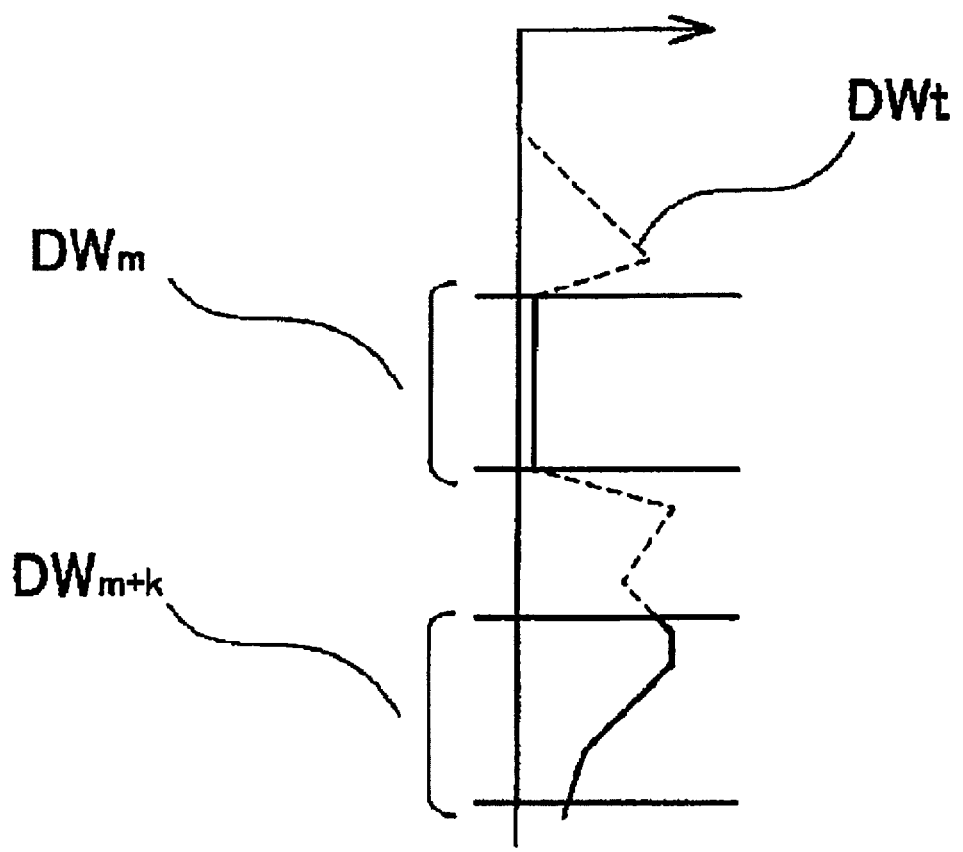
FIG. 8 is a view illustrating the weighting used by the three-dimensional object detection unit according to the first embodiment.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$ in accordance with the weighting to form a histogram. FIG. 8 is a view illustrating the weighting used by the three-dimensional object detection unit 33.

As illustrated in FIG. 8, a small area $DW_m$ (where m is an integer 1 or greater and n−1 or less) is flat. In other words, in the small area $DW_m$, there is little difference between the maximum and minimum values of the count of number pixels indicating a predetermined difference. The three-dimensional object detection unit 33 reduces the weighting of this type of small area $DW_m$. This is because a flat small area $DW_m$ lacks a characteristic and there is a high possibility that an error will be magnified when the offset amount is calculated.

On the other hand, the small area $DW_{m+k}$ (where k is an integer n−m or less) has abundant undulation. In other words, in the small area $DW_{m+k}$, there is considerable difference between the maximum and minimum values of the count of number pixels indicating a predetermined difference. The three-dimensional object detection unit 33 increases the weighting of this type of small area $DW_{m+k}$. This is because a small area $DW_{m+k}$ abundant in undulation is characteristic and there is a high possibility that the offset amount will be accurately calculated. Weighting the small areas in this manner makes it possible to enhance the precision for calculating the movement distance.

The difference waveform $DW_t$ is divided into a plurality of small areas $DW_{t1}$ to $DW_{tn}$ in the present embodiment in order to enhance the precision for calculating the movement distance, but division into the small areas $DW_{t1}$ to $DW_{tn}$ is not required when the precision for calculating movement distance is not so needed. In this case, the three-dimensional object detection unit 33 calculates the movement distance from the offset amount of the difference waveform $DW_t$ when the error between the difference waveform $DW_t$ and the difference waveform $DW_{t-1}$ is at a minimum. In other words, the method for determining the offset amount between the difference waveform $DW_{t-1}$ at a single moment prior and the difference waveform $DW_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the adjacent vehicle.

Figure 9:
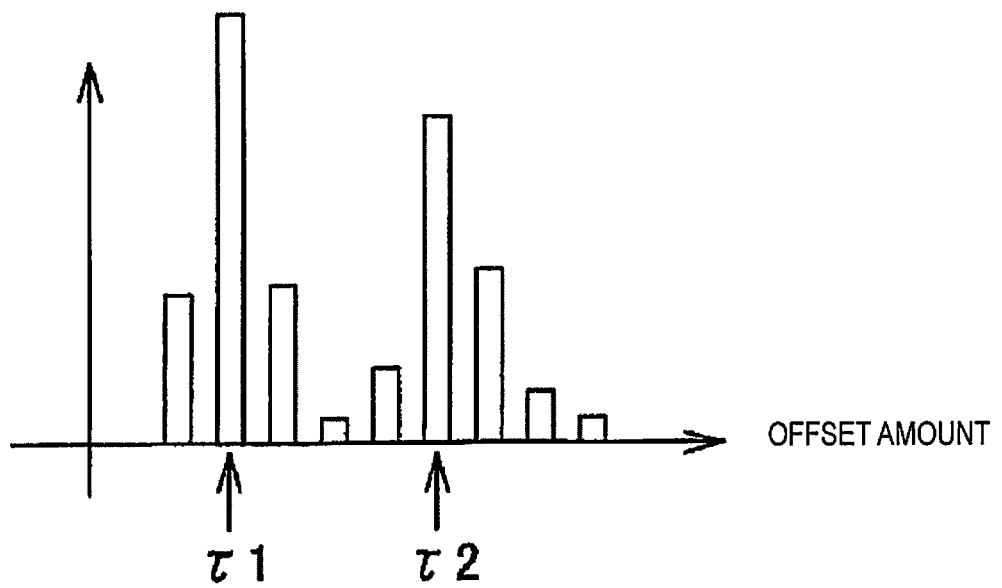
FIG. 9 is a view illustrating another example of the histogram obtained by the three-dimensional object detection unit according to the first embodiment.

FIG. 9 is a view illustrating another example of the histogram obtained by the three-dimensional object detection unit 33. When a stationary object other than the adjacent vehicle is present within the view angle of the camera 10, two maximum values τ1, τ2 appear in the resulting histogram. In this case, one of the two maximum values τ1, ξ2 is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of adjacent vehicles present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible, to prevent a situation in which an errant movement distance is calculated such as when there is a plurality of maximum values.

The three-dimensional object detection unit 33 furthermore time-differentiates the calculated relative movement distance of the three-dimensional object to thereby calculate the relative movement speed of the three-dimensional object in relation to the host vehicle and also adds the host vehicle speed detected by the speed sensor 20 to the calculated relative movement speed of the three-dimensional object to thereby calculate the relative movement speed of the three-dimensional object.

Figure 10:
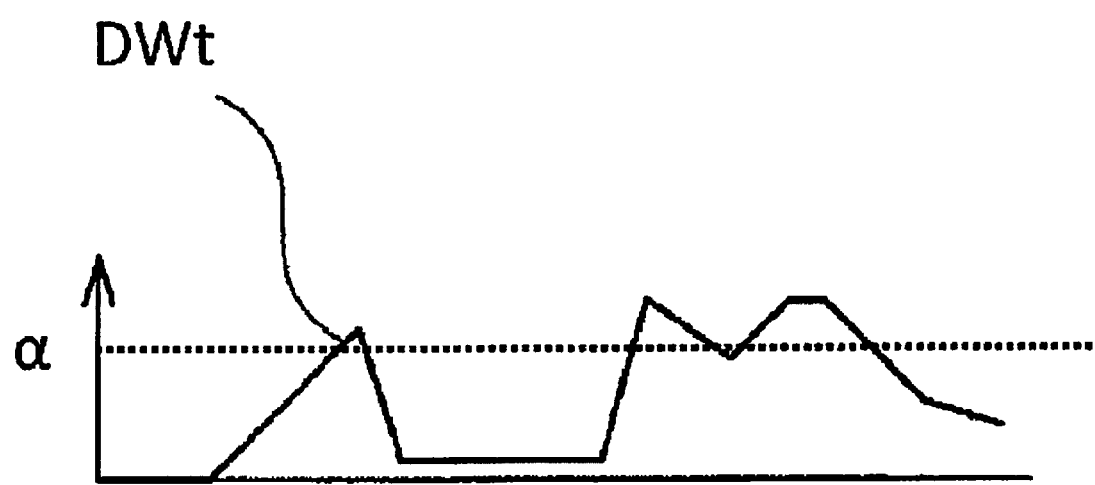
FIG. 10 is a view for describing the method for assessing an adjacent vehicle present in an adjacent lane.

After the difference waveform $DW_t$ has been generated, the three-dimensional object detection unit 33 detects an adjacent vehicle present in the adjacent lane based on the generated difference waveform $DW_t$. Here, FIG. 10 is a view for describing the method for assessing another vehicle present in an adjacent lane, and shows an example of the difference waveform $DW_t$ and the threshold value α for detecting an adjacent vehicle present in an adjacent lane. For example, the three-dimensional object detection unit 33 determines whether the peak of the generated difference waveform $DW_t$ is at a threshold value α or greater, and when the peak of the generated difference waveform $DW_t$ is at a threshold value α or greater, the detected three-dimensional object is assessed to be an adjacent vehicle present in the adjacent lane, and when the peak of the difference waveform $DW_t$ is not at a threshold value α or greater, the three-dimensional object detected by the three-dimensional object detection unit 33 is not assessed to be an adjacent vehicle present in the adjacent lane, as illustrated in FIG. 10. When the detected three-dimensional object has been assessed to be an adjacent vehicle, the three-dimensional object detection unit 33 transmits a notification signal to the notification device 50, and thereby notifies the driver that an adjacent vehicle is present rearward of the host vehicle.

Returning to FIG. 3, the detection area setting unit 34 sets the detection areas A1, A2 for detecting a three-dimensional object. Specifically, the detection area setting unit 34 determines whether the host vehicle has been passed by the adjacent vehicle based on the detection results of the three-dimensional object detection unit 33, and when it has been determined that the host vehicle has been passed by the adjacent vehicle, the detection areas A1, A2 are widened rearward with respect to the direction of vehicle progress.

FIG. 11 is a view for describing the method for setting the detection areas by the detection area setting unit 34. In FIG. 11, two adjacent vehicles V2, V2' are traveling in the adjacent lane in consecutive fashion, and illustrates a situation in which the first leading adjacent vehicle V2 has been detected. In the example illustrated in FIG. 11, only the detection area A1 is illustrated and described, but detection area A2 is set in the same manner.

Figure 11A:
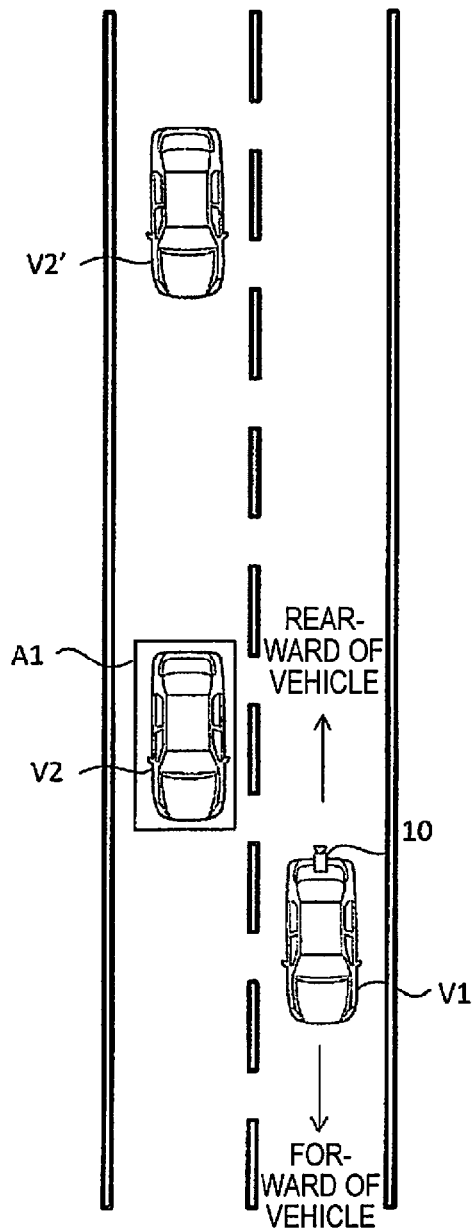
FIGS. 11A and 11B are views for describing the method for setting the detection areas by the detection area setting unit according to the first embodiment.

The detection area setting unit 34 sets the breadth (length) of the detection area A1 in the direction of progress of the host vehicle in advance to be, e.g., 7 m, and detection of three-dimensional objects is carried out in this detection area A1. As illustrated in FIG. 11A, when the first leading adjacent vehicle V2 has been detected by the three-dimensional object detection unit 33, the detection area setting unit 34 determines whether the relative movement speed of the adjacent vehicle V2 in relation to the host vehicle V1 is at a predetermined speed or greater. The predetermined speed is not particularly limited, but may be set to be, e.g., 10 km/h (i.e., the speed of the host vehicle V1 is 10 km/h greater than the speed of the adjacent vehicle V2) with consideration given to the detection error of the relative movement speed of the adjacent vehicle V2 in relation to the host vehicle V1. The relative movement speed of the adjacent vehicle V2 in relation to the host vehicle V1 may be acquired from the three-dimensional object detection unit 33, or may be calculated by the detection area setting unit 34.

Figure 11B:
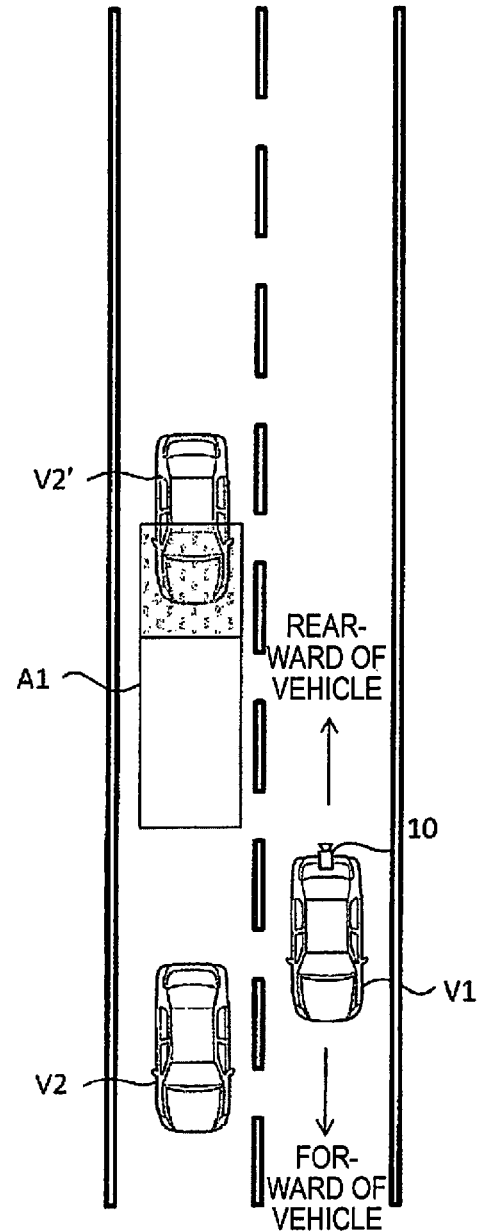

When the relative movement speed of the adjacent vehicle V2 in relation to the host vehicle V1 is at a predetermined speed or greater, the detection area setting unit 34 determines that the first adjacent vehicle V2 is passing the host vehicle V1, and the detection area A1 is widened rearward with respect to the direction of vehicle progress V1, as illustrated in FIG. 11B. For example, when the breadth of the detection area A1 in the direction of progress of the host vehicle V1 set in advance is 7 m, the detection area setting unit 34 widens the detection areas A1, A2 rearward by 2 m with respect to the direction of vehicle progress when it has been determined that the host vehicle V1 has been passed by the adjacent vehicle V2, and the breadth of the detection area A1 in the direction of progress of the host vehicle can be set to 9 m overall. In FIG. 11B, the range of the detection area A1 widened rearward with respect to the direction of vehicle progress is illustrated in gray.

Thus, when it has been determined that the first adjacent vehicle V2 is passing the host vehicle V1, widening the detection area A1 rearward with respect to the direction of vehicle progress V1 allows a second adjacent vehicle V2' trailing the leading first adjacent vehicle V2 to be detected in the detection area A1, as illustrated in FIG. 11B.

On the other hand, the second adjacent vehicle V2' cannot be detected in the detection area A1 when the first adjacent vehicle V2 has passed the host vehicle V1 in the case that the detection area A1 is not widened rearward with respect to the direction of vehicle progress V1 in a conventional manner, even when it has been determined that the adjacent vehicle V2 is passing the host vehicle V1. For this reason, it is determined that an adjacent vehicle is not present rearward of the host vehicle and notification by the notification device 50 is not carried out by the three-dimensional object detection unit 33, even through an adjacent vehicle V2' is present rearward of the host vehicle. Thus, in a situation in which the leading first adjacent vehicle V2 is passing the host vehicle V1 and notification that an adjacent vehicle is present rearward of the host vehicle is not carried out, there are cases in which it is possible that the driver will determine that an adjacent vehicle is not present in the adjacent lane rearward of the host vehicle, and the driver will change the lane of the host vehicle V1, even though a second adjacent vehicle V2' is present rearward of the host vehicle V1, and the host vehicle V1 and the second adjacent vehicle V2' come close to each other. In contrast, in the present embodiment, when it has been determined that a leading first adjacent vehicle V2 is passing the host vehicle V1, widening the detection area A1 rearward with respect to the direction of vehicle progress V1 allows a second adjacent vehicle V2' in the detection area A1 to be detected, and it is possible to notify the driver that a second adjacent vehicle V2 is present.

In the present embodiment, the detection area setting unit 34 is capable of varying the amount by which the detection areas A1, A2 are to be widened rearward with respect to the direction of vehicle progress in accordance with the relative movement speed of the adjacent vehicle V2 in relation to the host vehicle V1. For example, the detection area setting unit 34 can predict that that greater the relative movement speed of the first adjacent vehicle V2 is in relation to the host vehicle V1, the faster the relative movement speed of the second adjacent vehicle V2' will be, and that the second adjacent vehicle will soon catch the host vehicle and increase the amount by which the detection areas A1, A2 are to be widened in the rearward direction. Alternatively, it may be determined that the greater the relative movement speed of the first adjacent vehicle V2 is in relation to the host vehicle V1, the time that the adjacent vehicle will be present rearward of the host vehicle will be shorter, and the amount by which the detection areas A1, A2 are to be widened in the rearward direction can be reduced. Furthermore, it is also possible to use a configuration in which consideration given to the speed of the host vehicle where the second adjacent vehicle V2' is not predicted to soon catch the host vehicle when the speed of the host vehicle is sufficiently high and the distance between the first adjacent vehicle V2 and the second adjacent vehicle V2' is great, and the amount by which the detection areas A1, A2 are to be widened is not increased, even when the relative movement speed of the first adjacent vehicle V2 is high in relation to the host vehicle V1.

Moreover, the detection area setting unit 34 acquires steering angle information from the steering angle sensor 40 and determines whether the host vehicle is turning based on the acquired steering angle information. When it has been determined that the host vehicle is turning, the detection area setting unit 34 then calculates the turn radius of the host vehicle based on the steering angle information, and modifies the amount by which the detection areas are to be widened in the rearward direction in accordance with the calculated turn radius when the host vehicle has been passed by an adjacent vehicle. Specifically, the detection area setting unit 34 has maps or computational formulas that indicate the correlation between the turn radius and the detection areas A1, A2 which are modified in accordance with the turn radius, and decides the amount by which the detection areas are to be widened in the rearward direction when the host vehicle has been passed by an adjacent vehicle.

Figure 12B:
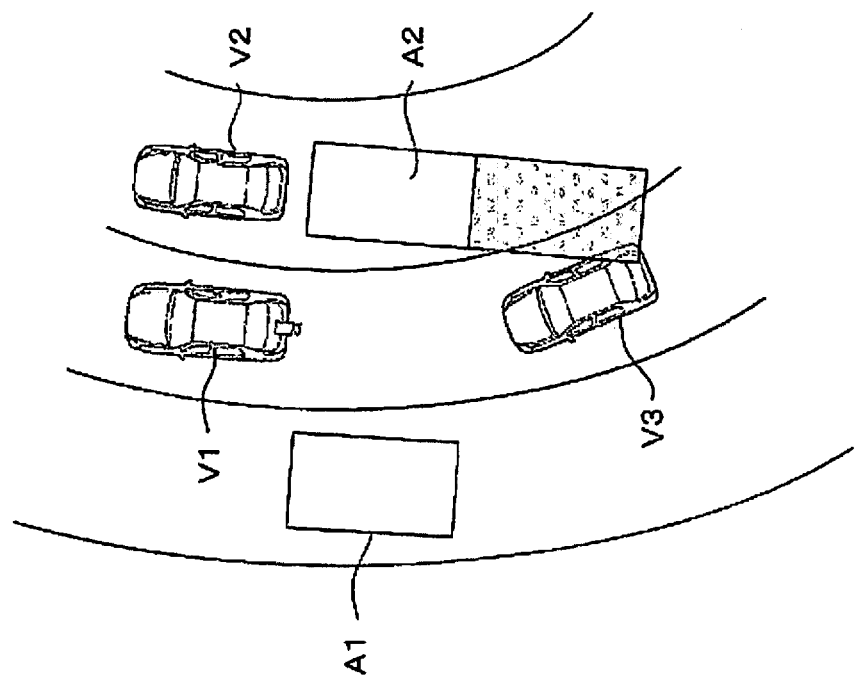
FIGS. 12A and 12B are views for describing the method for setting the detection areas when the host vehicle is turning.
Figure 12A:
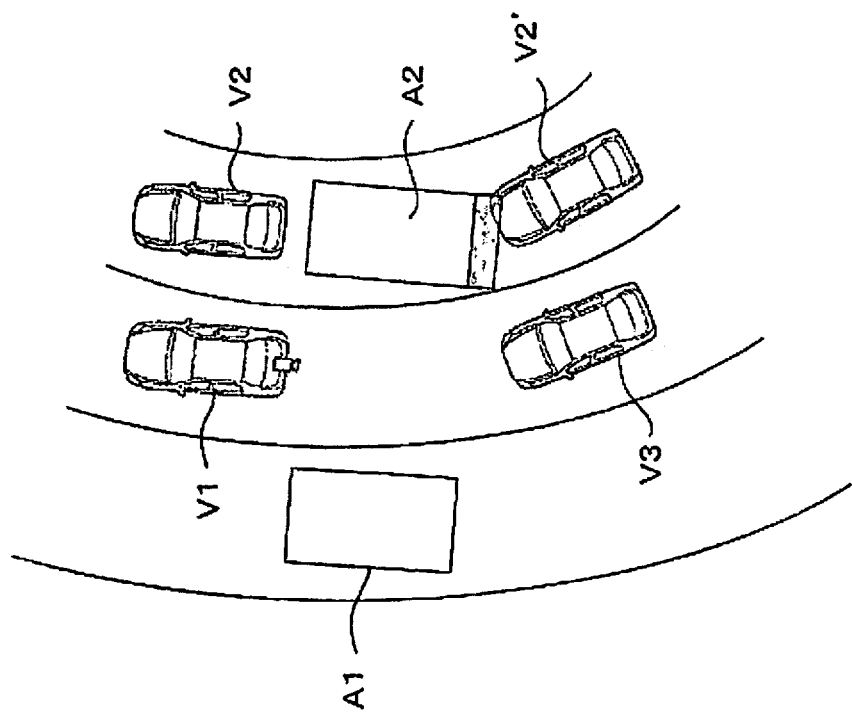

Here, FIG. 12 is view for describing the method for setting the detection area when the host vehicle is turning. FIG. 12A is a view illustrating an example of the detection area set when the host vehicle is turning in the present embodiment. FIG. 12B is a view illustrating an example of the detection area when the host vehicle is turning and the method for setting the detection area in the present embodiment. In a situation in which the host vehicle V1 has been passed by the leading first adjacent vehicle V2, the detection area setting unit 34 modifies the amount by which the detection area A2 is widened in the rearward direction so that the detection area does not enter into the lane in which the host vehicle is traveling when it has been determined that the host vehicle is turning, as illustrated in FIG. 12A. Specifically, the detection area setting unit 34 reduces the amount by which the detection area A2 set inside the turn is to be widened in the rearward direction, in commensurate fashion to the magnitude of the turn radius of the host vehicle V1 so that the detection area does not enter into the lane in which the host vehicle is traveling.

On the other hand, when the detection area V2 is uniformly widened by a fixed amount when the host vehicle V1 is determined to be turning, a trailing vehicle V3 traveling in the lane in which the host vehicle V1 is traveling is detected in the detection area A2, as illustrated in FIG. 12B, and there are cases in which the trailing vehicle V3 is thereby errantly detected as an adjacent vehicle traveling in an adjacent lane. In response to this, in the present embodiment, the amount by which the rearward with respect to the direction of vehicle progress V1 is widened is reduced in commensurate fashion to a smaller turn radius of the host vehicle V1, as illustrated in FIG. 12A, thereby making it possible to effectively prevent a situation in which the trailing vehicle V3 is detected in the detection area A2. As a result, an adjacent vehicle traveling in an adjacent lane can be suitably detected.

Figure 13:
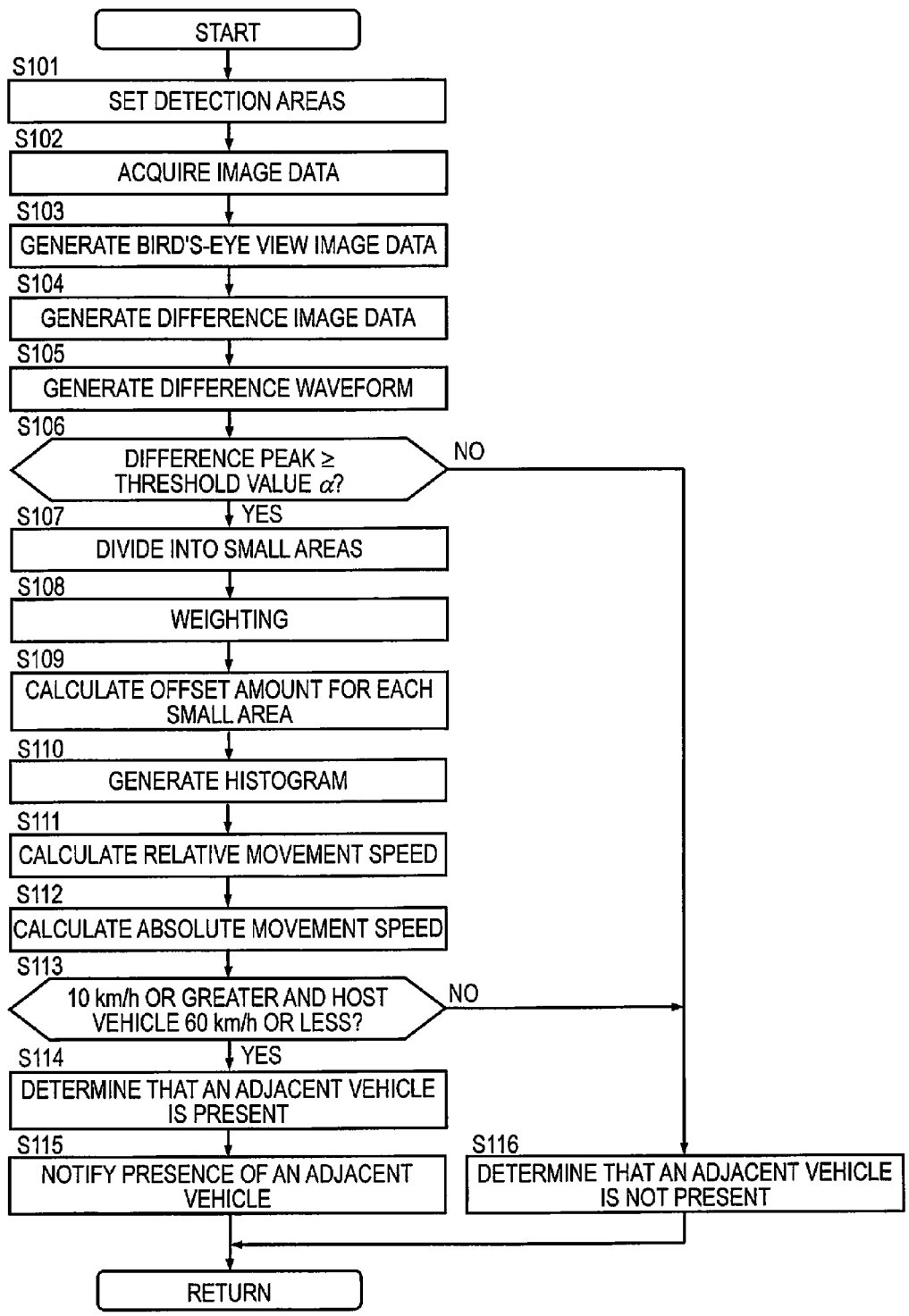
FIG. 13 is a flowchart illustrating the method for detecting an adjacent vehicle according to the first embodiment.

Described next is the process for detecting an adjacent vehicle in accordance with the present embodiment. FIG. 13 is a flowchart illustrating the method for detecting an adjacent vehicle of the first embodiment. First, the detection areas A1, A2 for detecting an adjacent vehicle are set by the detection area setting unit 34 (step S101), as illustrated in FIG. 13. In step S101, the detection areas that are set are those set in a later-described detection area setting process (see FIG. 14).

Data of a captured image is acquired by the computer 30 from the camera 10 (step S102), and data of a bird's-eye view image $PB_t$ is generated (step S103) by the viewpoint conversion unit 31 based on the data of the captured image thus acquired.

Next, the alignment unit 32 aligns the bird's-eye view image $PB_t$ data and the bird's-eye view image $PB_{t-1}$ data at a single moment prior, and generates the data of a difference image $PD_t$ (step S104). The three-dimensional object detection unit 33 then counts the number of difference pixels DP having a pixel value of "1" to thereby generate a difference waveform $DW_t$ from the difference image $PD_t$ data (step S105).

The three-dimensional object detection unit 33 then determines whether a peak in the difference waveform $DW_t$ is at a predetermined threshold value α or greater (step S106). When the peak of the difference waveform $DW_t$ is not at the threshold value α or greater, i.e., when there is essentially no difference, it is thought that a three-dimensional object is not present in the captured image. Accordingly, when it has been determined that the peak of the difference waveform $DW_t$ is not at the threshold value α or greater (step S106=No), the three-dimensional object detection unit 33 determines that another vehicle is not present (step S116), and thereafter returns to step S101 and repeats the above-described process illustrated in FIG. 13.

On the other hand, when the peak in the difference waveform $DW_t$ is determined to be at a threshold value α or greater (step S106=Yes), it is determined by the three-dimensional object detection unit 33 that a three-dimensional object is present in the adjacent lane and proceeds to step S107. The difference waveform $DW_t$ is divided into a plurality of small areas $DW_{t1}$ to $DW_{tn}$ by the three-dimensional object detection unit 33. The three-dimensional object detection unit 33 next imparts weighting to each of the small areas $DW_{t1}$ to $DW_{tn}$ (step S108), calculates the offset amount for each of the small areas $DW_{t1}$ to $DW_{tn}$ (step S109), and generates a histogram with consideration given to the weightings (step S110).

The three-dimensional object detection unit 33 calculates the relative movement distance, which is the movement distance of the adjacent vehicle in relation to the host vehicle, based on the histogram, time-differentiates the calculated relative movement distance to thereby calculate the relative movement speed of the three-dimensional object in relation to the host vehicle (step S111), adds the host vehicle speed detected by the speed sensor 20 to the calculated relative movement speed, and calculates the absolute movement speed of the three-dimensional object in relation to the host vehicle (step S112).

The three-dimensional object detection unit 33 thereafter determines whether the relative movement speed of the three-dimensional object is 10 km/h or greater and whether the relative movement speed of the three-dimensional object in relation to the host vehicle is +60 km/h or less (step S113).

When both conditions are satisfied (step S113=Yes), the three-dimensional object detection unit 33 determines that the detected three-dimensional object is an adjacent vehicle present in the adjacent lane and that an adjacent vehicle is present in the adjacent lane (step S114). In the subsequent step S115, the driver is thereby notified by the notification device 50 that an adjacent vehicle is present rearward of the host vehicle. The process then returns to step S101, and repeats the process illustrated in FIG. 13. On the other hand, when either of the conditions is not satisfied (step S113=No), the three-dimensional object detection unit 33 determines that an adjacent vehicle is not present in the adjacent lane (step S116). The process returns to step S101, and repeats the process illustrated in FIG. 13.

In the present embodiment, the detection areas A1, A2 are the rearward side directions of the host vehicle, and focus is placed on whether the host vehicle may possibly make contact with an adjacent vehicle should a lane change be made.

Accordingly, the process of step S113 is implemented. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would have moved ahead of the host vehicle when a lane change is made. For this reason, it can be said that step S113 determines adjacent vehicles that may become a problem when a lane change is made In step S113, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

It is furthermore possible to determine that relative movement speed of the adjacent vehicle is not negative or is not 0 km/h in lieu of the processing of step S113.

Figure 14:
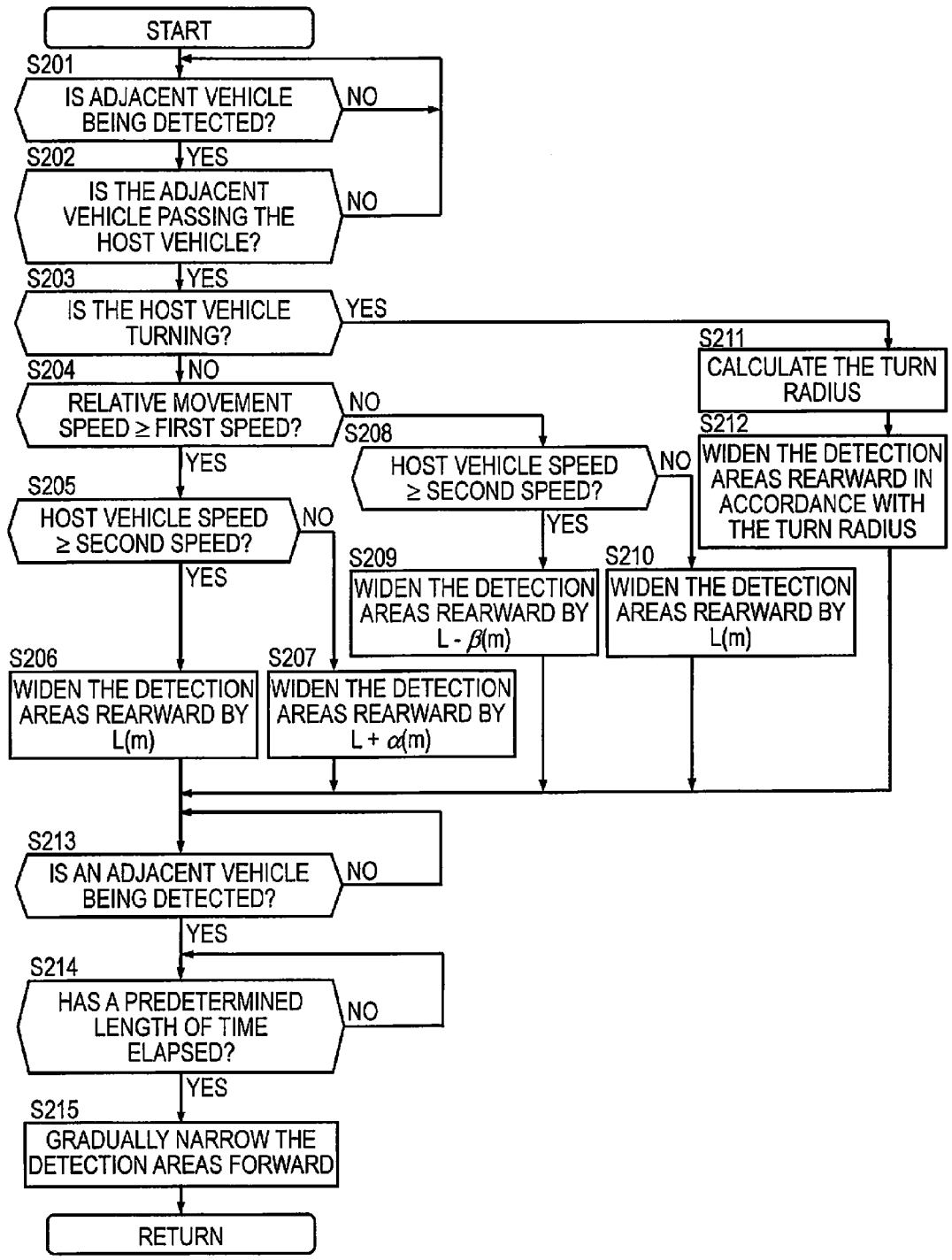
FIG. 14 is a part of a flowchart illustrating the method for setting the detection areas according to the first embodiment.

Next, the detection area setting process according to the first embodiment will be described. FIG. 14 is a flowchart illustrating the detection area setting process according to the first embodiment. The detection area setting process described below is carried out in parallel to the adjacent vehicle detection process illustrated in FIG. 13, and the detection areas A1, A2 set by the detection area setting process are set in the adjacent vehicle detection process illustrated in FIG. 13.

First, in step S201, the detection area setting unit 34 determines whether an adjacent vehicle is being detected. Specifically, when the detection area setting unit 34 has determined that an adjacent vehicle is present in the detection areas A1, A2 in the adjacent vehicle detection process illustrated in FIG. 13, it is determined that an adjacent vehicle is being detected, and the process proceeds to step S202, and when the detection area setting unit has been determined that an adjacent vehicle is not present in the detection areas A1, A2, it is determined that an adjacent vehicle is not being detected, and the process stands by in step S201 until an adjacent vehicle is detected.

In step S202, the detection area setting unit 34 determines whether an adjacent vehicle has passed the host vehicle. Specifically, the detection area setting unit 34 acquires the relative movement speed of the adjacent vehicle in relation to the host vehicle from the three-dimensional object detection unit 33, and determines whether the relative movement speed of the adjacent vehicle is a predetermined speed (e.g., 10 km/h) or greater based on the acquired relative movement speed of the adjacent vehicle. When the relative movement speed of the adjacent vehicle in relation to the host vehicle is a predetermined speed or greater, it is determined that the adjacent vehicle is passing the host vehicle, and the process proceeds to step S203. On the other hand, when the relative movement speed of the adjacent vehicle in relation to the host vehicle is less than the predetermined speed, it is determined that the adjacent vehicle is not passing the host vehicle, and the process returns to step S201.

In step S203, the detection area setting unit 34 determines whether the host vehicle is turning. The method for assessing whether the host vehicle is turning is not particularly limited, but in the present embodiment, the following method is used to assess whether the host vehicle is turning.

In other words, the detection area setting unit 34 first predicts whether the host vehicle V1 is in a turning state after a predetermined length of time (may also be referred to hereinbelow as turning state prediction). Specifically, the detection area setting unit 34 refers to a captured image acquired from the camera 10, detects lanes (e.g., white lines) on the road surface, and calculates the lane curvature as a parameter illustrating the road shape. The detection area setting unit 34 then predicts the road shape in front of the host vehicle, i.e., the turn radius of the host vehicle until a predetermined length of time has elapsed, based on the computed lane curvature and the speed obtained from the speed sensor 20.

Furthermore, the detection area setting unit 34 calculates the current turn radius of the host vehicle V1 in accordance with Formula 1 below based on the host vehicle speed obtained from the speed sensor 20 and the steering angle obtained from the steering angle sensor 40.

Formula 1

$$\rho = (1 + KV^2)(nL/\phi) \quad (1)$$

In formula 1, $\rho$ is the turn radius, K is the stability factor, V is the host vehicle speed, L is the wheel base, n is the steering gear ratio, and $\phi$ is the steering angle.

The detection area setting unit 34 assesses that the host vehicle V1 is turning when the turn radius predicted in the above-described turning state prediction and the current turn radius obtained based on formula 1 are at a predetermined threshold value or greater. When it has been determined that the host vehicle is turning, the process proceeds to step S211. On the other hand, when it has been determined that the host vehicle is not turning, the process proceeds to step S204.

In steps S204 to S210, processing is carried out to widen the detection areas rearward with respect to the direction of vehicle progress based on the relative movement speed of the adjacent vehicle in relation to the host vehicle and the speed information of the host vehicle.

Specifically, the detection area setting unit 34 widens and sets (step S206) the detection areas rearward by L(m) from a range set in advance when the relative movement speed of the adjacent vehicle in relation to the host vehicle is a first speed or greater (step S204=Yes), and the speed of the host vehicle is a second speed or greater (step S205=Yes). On the other hand, the detection area setting unit 34 widens and sets (step S207) the detection areas rearward by L+α(m) from the range set in advance when the relative movement speed of the adjacent vehicle in relation to the host vehicle is the first speed or greater (step S204=Yes), and the speed of the host vehicle is less than the second speed (step S205=No). The first speed is not particularly limited, and it is possible to use a speed that allows determination that the second adjacent vehicle will soon catch the host vehicle when, e.g., a second adjacent vehicle is traveling at the first speed. Also, the second speed is not particularly limited, and it is possible to use a speed that allows determination that there is congestion when, e.g., the host vehicle is traveling at the second speed.

In this manner, when the relative movement speed of the adjacent vehicle in relation to the host vehicle is the first speed or greater, and the speed of the host vehicle is less than the second speed, it is determined that a second adjacent vehicle will soon catch the host vehicle and the amount by which the detection areas are widened is set to an amount (e.g., L+α(m)) that is greater than an amount decided in advance (e.g., L(m)) (step S207). The second adjacent vehicle which will soon pass the host vehicle can be suitably detected. Also, when the relative movement speed of the adjacent vehicle in relation to the host vehicle is the first speed or greater, and the speed of the host vehicle is the second speed or greater, it is predicted that the speed of the first adjacent vehicle V2 is considerably high because the speed of the host vehicle is sufficiently high, and it is determined that the distance between the first adjacent vehicle V2 and the second adjacent vehicle is increasing. Accordingly, in comparison with when the speed of the host vehicle is less than a predetermined second speed, it is determined that the second adjacent vehicle will not soon catch the host vehicle and the amount by which the detection areas A1, A2 are widened is set to an amount (e.g., L(m)) decided in advance (step S208).

The detection area setting unit 34 widens and sets (step S209) the detection areas rearward by L-β(m) from a range set in advance when the relative movement speed of the adjacent vehicle in relation to the host vehicle is less than the first speed (step S204=No), and the speed of the host vehicle is a second speed or greater (step S208=Yes). On the other hand, the detection area setting unit 34 widens and sets (step S210) the detection areas rearward by L(m) from a range set in advance when the relative movement speed of the adjacent vehicle in relation to the host vehicle is less than the first speed (step S204=No), and the speed of the host vehicle is less than the second speed (step S208=No).

In this manner, the detection area setting unit 34 may determine that there is a high possibility that the distance between consecutive first and second adjacent vehicles is narrow and that two adjacent vehicles are present immediately rearward of the host vehicle, and the amount by which the detection areas are to be widened is set to an amount decided in advance (e.g., L(m)) (step S210) when the relative movement speed of the adjacent vehicle in relation to the host vehicle is less than the first speed and when the speed of the host vehicle is less than a second speed, e.g., in congestion conditions. On the other hand, when the speed of the host vehicle is at a predetermined second speed or greater, the first adjacent vehicle must also be traveling at a high speed, and it is therefore determined that the distance between the consecutive first adjacent vehicle and second adjacent vehicle is constant and the amount by which the detection areas are to be widened rearward is set to an amount that is less than the amount set in advance (e.g., L−β(m)) (step S209). In this manner, deciding the amount by which the detection areas are to be widened based on the relative movement speed of the adjacent vehicle in relation to the host vehicle and the speed of the host vehicle allows the detection areas to be set in a suitable range that corresponds to the travel conditions of the host vehicle.

Also, when it has been determined that the host vehicle is turning in step S203, the detection area setting unit 34 calculates the current turn radius of the host vehicle in step S211. The method for calculating the current turn radius of the host vehicle is not particularly limited, and in the present embodiment, the current turn radius of the host vehicle can be calculated in the manner described below.

In other words, the detection area setting unit 34 decides the current turn radius based on the turn radius calculated in step S203. Specifically, the detection area setting unit 34 refers to moment information and predicts the current turn radius based on the turn radius that existed until a predetermined length of time had elapsed as predicted in the turning state prediction of step S203. The detection area setting unit 34 compares the predicted current turn radius with the turn radius calculated in formula 1 noted above, and calculates the likelihood (i.e., the degree of plausibility) in relation to the predicted current turn radius. The detection area setting unit 34 then decides the turn radius after a predetermined length of time has elapsed as predicted in the turning state prediction to be the ultimate turn radius when the likelihood is at a predetermined assessment value or greater, and conversely decides the turn radius calculates using formula 1 noted above to be the ultimate turn radius when the likelihood is less than the predetermined assessment value.

In step S212, the detection area setting unit 34 decides the amount by which the detection areas are to be widened rearward based on the ultimate turn radius specified in step S211, and widens and sets the detection areas by the decided amount greater than the range set in advance.

Specifically, the detection area setting unit 34 reduces the amount by which the detection areas are to be widened rearward in commensurate fashion to a smaller turn radius so that the detection areas do not enter the lane in which the host vehicle is traveling, as illustrated in FIG. 13(A). The detection area setting unit 34 has maps or computational formulas that indicate the correlation between the turn radius and the detection areas A1, A2 which are modified in accordance with the turn radius, and sets the amount by which the detection areas A1, A2 using the maps or computational formulas.

In step S213, the detection area setting unit 34 determines whether an adjacent vehicle is still being detected. For example, when it is determined that the first adjacent vehicle V2 is still being detected in a detection area, and the process stands by in step S213, as illustrated in FIG. 11A, and on the other hand, when the first adjacent vehicle is no longer detected, as illustrated in FIG. 11B, the process proceeds to step S214. When a second adjacent vehicle has been detected prior to the first adjacent vehicle no longer being detected, it is determined whether the second adjacent vehicle is still being detected. It is thereby possible to suitably detect a third adjacent vehicle trailing the second adjacent vehicle.

In step S214, the detection area setting unit 34 assesses whether a predetermined time (e.g., two seconds) has elapsed after an adjacent vehicle is no longer detected in the detection areas. When the predetermined time has not elapsed, the process stands by in step S214 until a predetermined time has elapsed, and when the predetermined time has elapsed, the process proceeds to step S215. The detection area setting unit 34 gradually narrows the detection areas forward with respect to the direction of vehicle progress at a lower speed than the speed at which the detection areas are widened and ultimately returns the detection areas to their original sizes prior to being widened.

Figure 15:
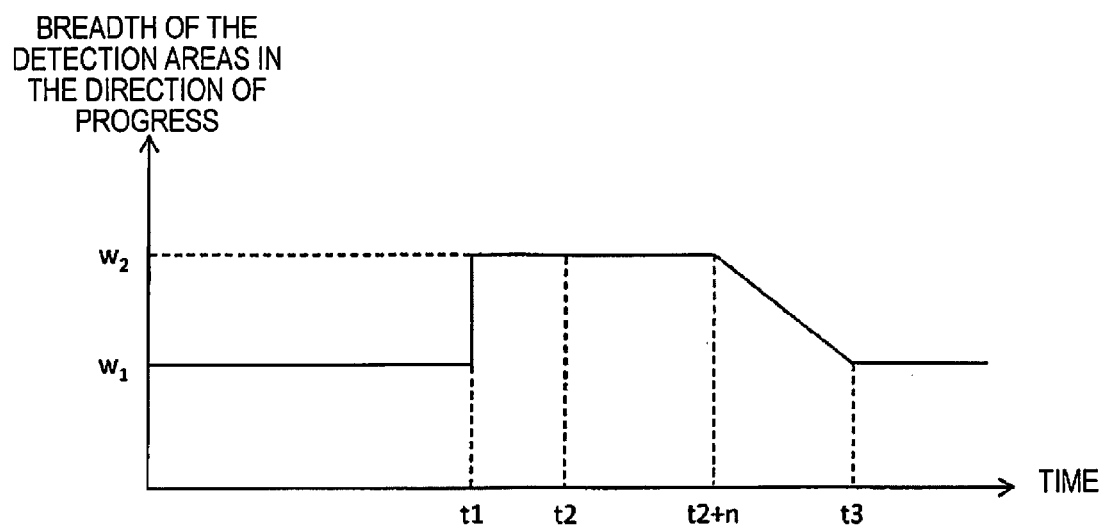
FIG. 15 is a view illustrating an example of the breath of the detection areas in the host vehicle progress direction set by the detection area setting unit according to the first embodiment.

Here, FIG. 15 is a graph illustrating an example of the breadth of the detection areas in the direction of progress of the host vehicle set in the present embodiment. For example, in the situational example illustrated in FIG. 15, when the first adjacent vehicle V2 is detected in the detection areas at time t1 (step S201=Yes), as illustrated in FIG. 11A, and the first adjacent vehicle V2 has been assessed to be passing the host vehicle V1 (step S202=Yes), the breadth of the detection areas in the direction of progress is increased rearward from $w_1$ to $w_2$ ($w_2 > w_1$), as illustrated in FIG. 11B (steps S206, S207, S209, S210).

The detection area setting unit 34 then determines whether the first adjacent vehicle V2 is being detected after the detection areas have been widened at time t1 (step S213). In the example illustrated in FIG. 15, the leading first adjacent vehicle V2 is no longer detected at time t2, and the detection areas are gradually narrowed forward from time t2+n in which a predetermined time n has elapsed from the time t2 (step S214). Also, in the situational example illustrated in FIG. 15, the breadth in the progress direction of the detection areas is ultimately returned, at time t3, to $w_1$ prior to the detection areas being widened.

In this manner, leaving the detection areas widened rearward for a predetermined length of time after the leading first adjacent vehicle V2 is no longer detected allows a second adjacent vehicle V2' approaching the host vehicle to be suitably detected even when the first adjacent vehicle V2 and the second adjacent vehicle V2' are separated in distance. Also, when a predetermined length of time has elapsed after the leading first adjacent vehicle V2 is no longer detected, gradually narrowing the detection areas forward allows the second adjacent vehicle V2' approaching the host vehicle to be more reliably detected in comparison with when the detection areas are narrowed in a single step.

The above-noted predetermined length of time n may be modified in accordance with the relative movement speed of the adjacent vehicle V2 in relation to the host vehicle V1. For example, the detection area setting unit 34 may be configured so as to predict that the movement speed of the second adjacent vehicle V2' is greater in commensurate fashion to a greater relative movement speed of the first adjacent vehicle V2 in relation to the host vehicle V1 and that the second adjacent vehicle will soon catch the host vehicle, and to increase the predetermined time n. Alternatively, it is also possible to use configuration in which it is predicted that the time the adjacent vehicle stays rearward of the host vehicle is shorter in commensurate fashion to a greater relative movement speed of the first adjacent vehicle V2 in relation to the host vehicle V1, and to reduce the predetermined time n. It is furthermore possible to use a configuration in which consideration is given to the speed of the host vehicle and it is predicted that the second adjacent vehicle V2' will not soon catch the host vehicle V1 when the speed of the host vehicle is sufficiently high and the distance between the first adjacent vehicle V2 and the second adjacent vehicle V2' is great, and the predetermined time n is not increased, even when the relative movement speed of the first adjacent vehicle V2 in relation to the host vehicle V1 is high. In this manner, setting the predetermined time n in accordance with the travel state of the host vehicle allows the second adjacent vehicle V2' to be suitably detected.

As described above, in the first embodiment, a difference image $PD_t$ is generated based on the difference between two bird's-eye view images obtained at different moments, the number of pixels that indicate a predetermined difference in the difference image $PD_t$ is counted to form a frequency distribution and thereby generate a difference waveform, and an adjacent vehicle present in the adjacent lane is detected based on the generated difference waveform. Furthermore, in the present embodiment, it is determined whether the adjacent vehicle has passed the host vehicle, and when it has been determined that the adjacent vehicle has passed the host vehicle, the detection areas A1, A2 are widened rearward of the direction of progression of the host vehicle. In the first embodiment, a first adjacent vehicle V2 is thereby detected in a situation in which two adjacent vehicles are traveling in a consecutive manner, as illustrated in FIG. 11A, and when it has been determined that the host vehicle V1 has been passed by the first adjacent vehicle V2, the detection area is widened rearward with respect to the direction of vehicle progress V1, as illustrated in FIG. 11B, whereby the second adjacent vehicle V2' can be detected, and the driver can thereby be notified that a second adjacent vehicle V2' is present rearward of the host vehicle. As a result, it is possible to effectively prevent a situation in which the first adjacent vehicle V2 has passed the host vehicle V1, whereby the driver determines that an adjacent vehicle is not present rearward of the host vehicle, the host vehicle makes a lane change, and the host vehicle V1 and the second adjacent vehicle V2' come close to each other.

Embodiment 2

Figure 16:
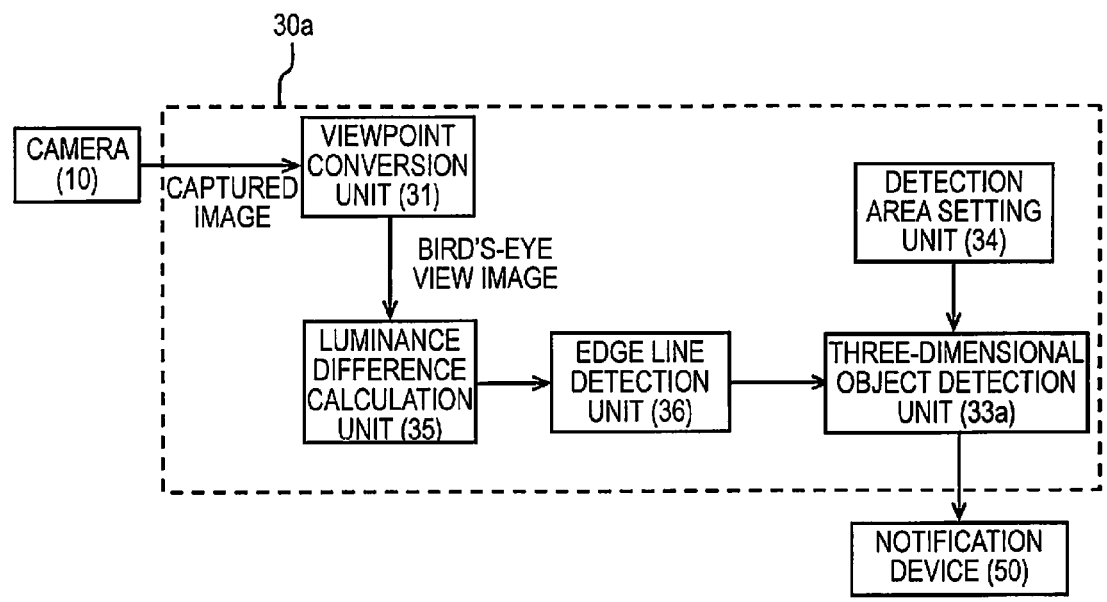
FIG. 16 is a block diagram illustrating the details of the computer according to the second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 16, and the operation is as described below. Here, FIG. 16 is a block view illustrating the details of the computer 30a according to the second embodiment.

The three-dimensional object detection device 1a according to the second embodiment is provided with a camera 10 and a computer 30a, as illustrated in FIG. 16. The computer 30a is provided with a viewpoint conversion unit 31, a luminance difference calculation unit 35, an edge line detection unit 36, a three-dimensional object detection unit 33a, and a detection area setting unit 34. The configuration of the three-dimensional object detection device 1a according to the second embodiment is described below.

Figure 17:
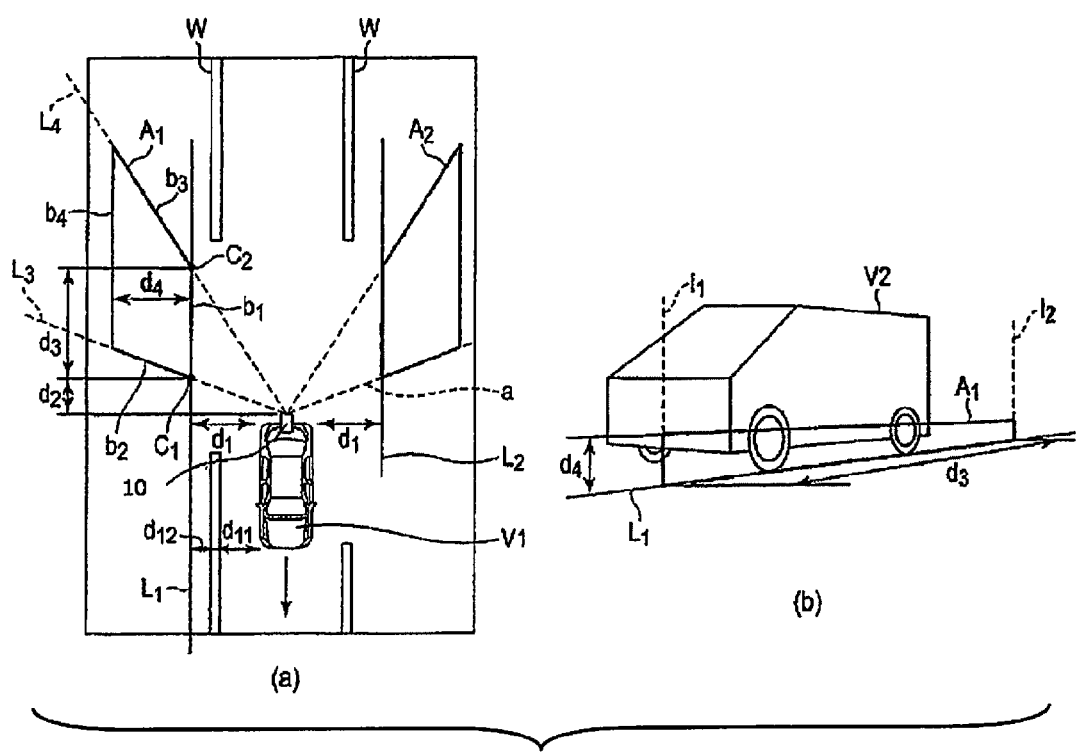
FIG. 17 is a view illustrating the travel state of the vehicle, with part (a) illustrating the positional relationship between the detection area and the like from a top plan view, and part (b) illustrating the positional relationship between the detection area and the like in real space from a perspective view.

FIG. 17 is a view illustrating the image range of the camera 10 in FIG. 16, with part (a) of FIG. 17 being a plan view, and part (b) of FIG. 17 being a perspective view in real space rearward from the host vehicle V1. The camera 10 is set to a predetermined view angle a, and the rearward side of the host vehicle V1 included in the predetermined view angle a is captured, as illustrated in part (a) of FIG. 17. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), and the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 17. In a bird's-eye view image, the distance d4 is the length illustrated in part (a) of FIG. 17. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d1 The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 17.

Returning to FIG. 16, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 35 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 35 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 35 is described in detail below.

Figure 18:
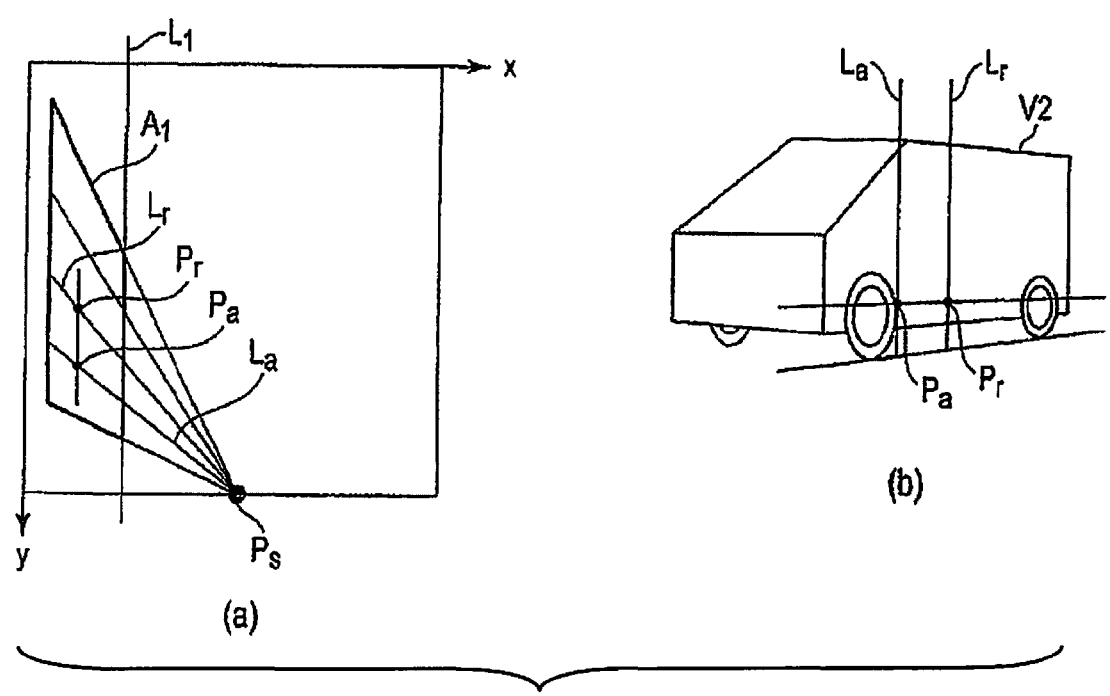
FIG. 18 is a view for describing the operation of the luminance difference calculation unit according to the second embodiment, with part (a) illustrating the positional relationship between the attention line, reference line, attention point, and reference point in a bird's-eye view image, and part (b) illustrating the positional relationship between the attention line, reference line, attention point, and reference point real space.

The luminance difference calculation unit 35 sets a first perpendicular imaginary line La (hereinbelow referred to as attention line La) that corresponds to a line segment extending in the perpendicular direction in real space and that passes through the detection area A1, as illustrated in FIG. 18(a). The luminance difference calculation unit 35 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 35 sets an attention point Pa on the attention line La (a point on the first perpendicular imaginary line). The luminance difference calculation unit 35 sets a reference point Pr on the reference line Lr (a point on the second perpendicular imaginary line). The attention line La, the attention point Pa, the reference line Lr, and the reference point Pr have the relationship in real space illustrated in FIG. 18(b). It is apparent from FIG. 18(b) that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 36 illustrated in FIG. 16 detects an edge line based on the luminance difference between the attention point Pa and the reference point Pr.

Figure 19:
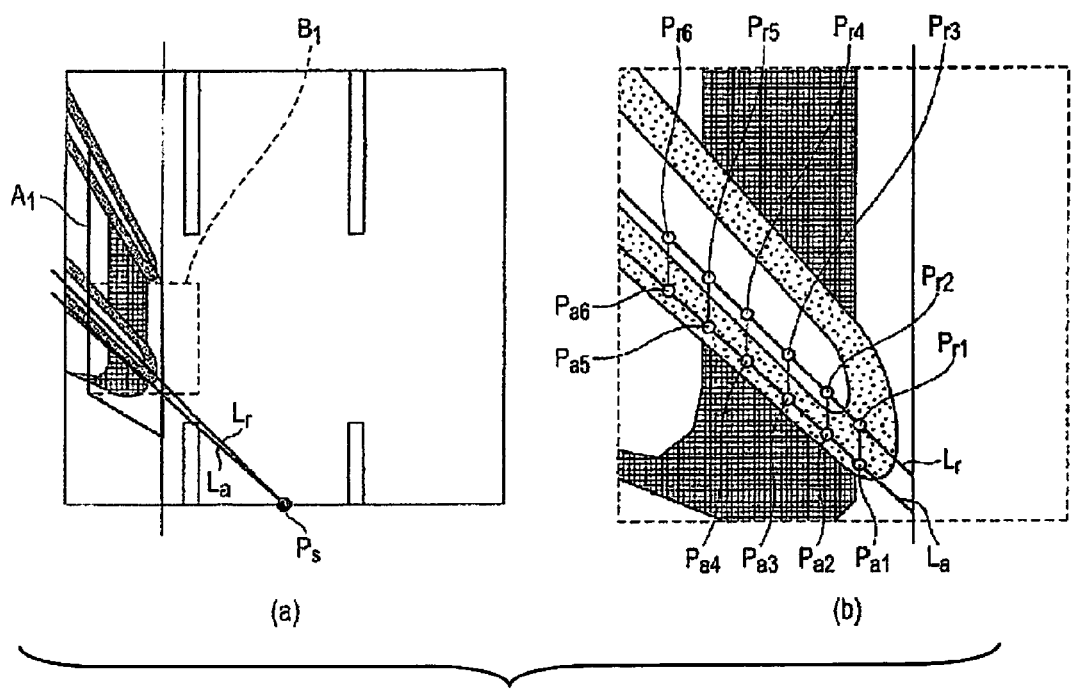
FIG. 19 is a view for describing the detailed operation of the luminance difference calculation unit according to the second embodiment, with part (a) illustrating the detection area in the bird's-eye view image, and part (b) illustrating the positional relationship between the attention line, reference line, attention point, and reference point in the bird's-eye view image.

This point will be described in greater detail. FIG. 19 is a view for describing the detailed operation of the luminance difference calculation unit 35. Part (a) of FIG. 19 illustrates a bird's-eye view image of the bird's-eye view state, and part (b) of FIG. 19 is an enlarged view of a portion B1 of the bird's-eye view image illustrated in part (a) of FIG. 19. In FIG. 19, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 19. The attention line La is set on a rubber portion of a tire of the adjacent vehicle V2 in the bird's-eye view image in part (b) of FIG. 19, as illustrated in the enlarged view of area B1 in part (a) of FIG. 19. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 35 sets a plurality of attention points Pa1 to PaN on the attention line La. In part (b) of FIG. 19, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of the plurality of positions (1–N) along the perpendicular imaginary line extending in the perpendicular direction in real space. The luminance difference calculation unit 35 calculates the luminance difference between, e.g., a first attention point Pa1 and a first reference point Pr1, and calculates the luminance difference between a second attention point Pa2 and a second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to $N^{th}$ attention points Pa3 to PaN and the third to $N^{th}$ reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 16, the edge line detection unit 36 detects the edge line from the continuous luminance difference calculated by the luminance difference calculation unit 35. For example, in the case illustrated in part (b) of FIG. 19, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 36 first assigns an attribute to the $i^{th}$ attention point Pai from the luminance difference between the $i^{th}$ attention point Pai (coordinates (xi, yi)) to the reference point Pri (coordinates (xi', yi')) in accordance with formula 1 noted below.

$s(xi,yi)=1$ when $I(xi,yi)>I(xi',yi')+t$ $s(xi,yi)=-1$ when $I(xi,yi)<I(xi',yi')-t$ $s(xi,yi)=0$ when the above do not hold true. Formula 2

In formula 2 above, t represents a predetermined threshold value, I(xi, yi) represents the luminance value of the $i^{th}$ attention point Pai, and I(xi', yi') represents the luminance value of the $i^{th}$ reference point Pri. In accordance with formula 2, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 36 assesses whether the attention line La is an edge line from the continuity c(xi, yi) of the attribute s along the attention line La based on the following formula 2.

$c(xi,yi)=1$ when $s(xi,yi)=s(xi+1,yi+1)$(excluding when 0=0)

$c(xi,yi)=0$ when the above does not hold true. Formula 3

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to thereby normalize the continuity c. The edge line detection unit 36 determines the attention line La to be an edge line when the normalized value has exceeded a threshold value θ. The threshold value θ is set in advance by experimentation or other means.

In other words, the edge line detection unit 36 determines whether the attention line La is an edge line based on formula 3 noted below. The edge line detection unit 36 then determines whether all of the attention lines La drawn on the detection area A1 are edge lines.

$$\Sigma c(xi, yi)/N >$$  Formula 4

Figure 20:
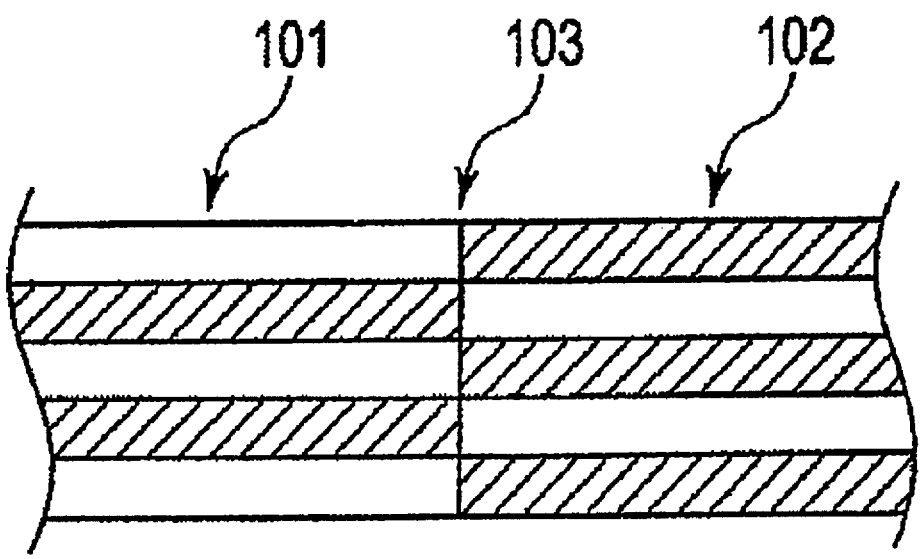
FIG. 20 is a view illustrating an image example for describing edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 20 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 36 assesses the location 103 to be an edge line only when there is continuity in the attributes of the luminance difference. Therefore, the edge line detection unit 36 is capable of suppressing errant assessment in which the location 103, which is not recognized as an edge line by human senses, is recognized as an edge line, and edges can be detected in accordance with human senses.

Returning to FIG. 16, the three-dimensional object detection unit 33a detects a three-dimensional object based on the quantity of edge lines detected by the edge line detection unit 36. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 36. Specifically, the three-dimensional object detection unit 33a determines whether the quantity of edge lines detected by the edge line detection unit 36 is a predetermined threshold value β or greater, and when the quantity of edge lines is a predetermined threshold value β or greater, the edge lines detected by the edge line detection unit 36 are determined to be the edge lines of a three-dimensional object, and a three-dimensional object based on edge lines is thereby detected to be an adjacent vehicle V2.

Furthermore, prior to detecting the three-dimensional object, the three-dimensional object detection unit 33a assesses whether the edge lines detected by the edge line detection unit 36 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 21:
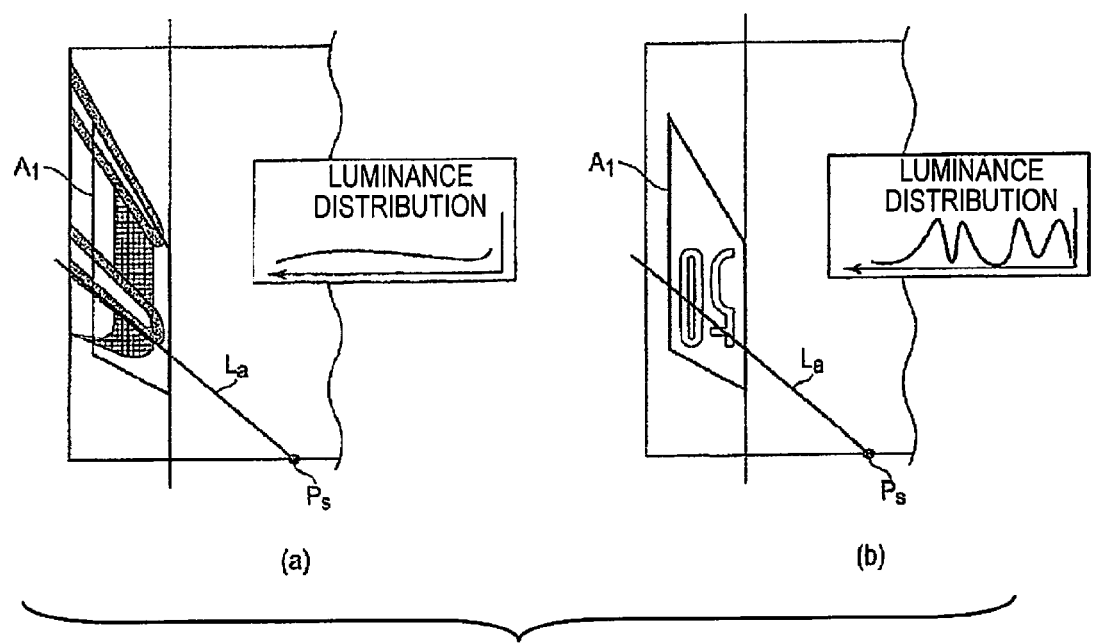
FIG. 21 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 21 is a view illustrating the luminance distribution on the edge line, with part (a) of FIG. 21 illustrating the edge line and the luminance distribution when an adjacent vehicle V2 as a three-dimensional object is present in the detection area A1, and part (b) of FIG. 21 illustrating the edge line and the luminance distribution when a three-dimensional object is not present in the detection area A1.

As illustrated in part (a) of FIG. 21, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 21. In this case, the change in luminance on the attention line La in the bird's-eye view image has considerable undulations. This is because the road and other portions of low luminance are mixed with the portions of high luminance in the white characters on the edge line.

The three-dimensional object detection unit 33a assesses whether an edge line has been detected by errant assessment based on differences in the luminance distribution on the attention line La as described above. The three-dimensional object detection unit 33a determines that the edge line has been detected by errant assessment when the change in luminance along the edge line is at a predetermined threshold value tb or greater, and determines that the edge line is not caused by a three-dimensional object. A reduction in precision for detection three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 5 or 6 noted below. The change in luminance of the edge line corresponds to the evaluation value in real space in the perpendicular direction. Formula 5 evaluates the luminance distribution using the total value of the square of the difference between the $i^{th}$ luminance value I(xi, yi) and the adjacent $i^{th}$+1 luminance value I(xi+1, yi+1) on the attention line La. Formula 6 evaluates the luminance distribution using the total value of the absolute value of the difference between the $i^{th}$ luminance value I(xi, yi) and the adjacent $i^{th}$+1 luminance value I(xi+1, yi+1) on the attention line La.

Evaluation value in perpendicular equivalent
direction=$\Sigma[\{I(xi,yi)-I(xi+1,yi+1)\}^2]$    Formula 5

Evaluation value in perpendicular equivalent
direction=$\Sigma|I(xi,yi)-I(xi+1,yi+1)|$    Formula 6

No limitation is imposed in the use of formula 6, and it is also possible to binarize an attribute b of an adjacent luminance value using a threshold value t2, and then sum the binarized attribute b for all of the attention points Pa, as in formula 7 noted below.

Evaluation value in perpendicular equivalent
direction=$\Sigma b(xi,yi)$ where $b(xi,yi)$=1 when $|(xi,yi)-I(xi+1,yi+1)|>t2$ and $b(xi,yi)$=0 when the above does not hold true.    Formula 7

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

Thus, the edge waveform is one mode of pixel distribution information that indicate a predetermined luminance difference, and the "pixel distribution information" in the present embodiment can be positioned with information indicating the state of distribution of "pixels having a luminance difference at a predetermined threshold value or greater" as detected along the direction in which the three-dimensional object collapses when the captured image is converted in viewpoint to a bird's-eye view image. In other words, the three-dimensional object detection unit 33a detects a three-dimensional object in a bird's-eye view image obtained by the viewpoint conversion unit 31, based on the pixel distribution information having a luminance difference at a predetermined threshold value or greater along the direction in which the three-dimensional object collapses when the viewpoint is converted to a bird's-eye view image.

The detection area setting unit 34 determines whether the adjacent vehicle has passed the adjacent vehicle in the same manner as in the first embodiment, and when it has been determined that the adjacent vehicle has passed the host vehicle, the detection areas A1, A2 is widened rearward with respect to the direction of vehicle progress.

Figure 22:
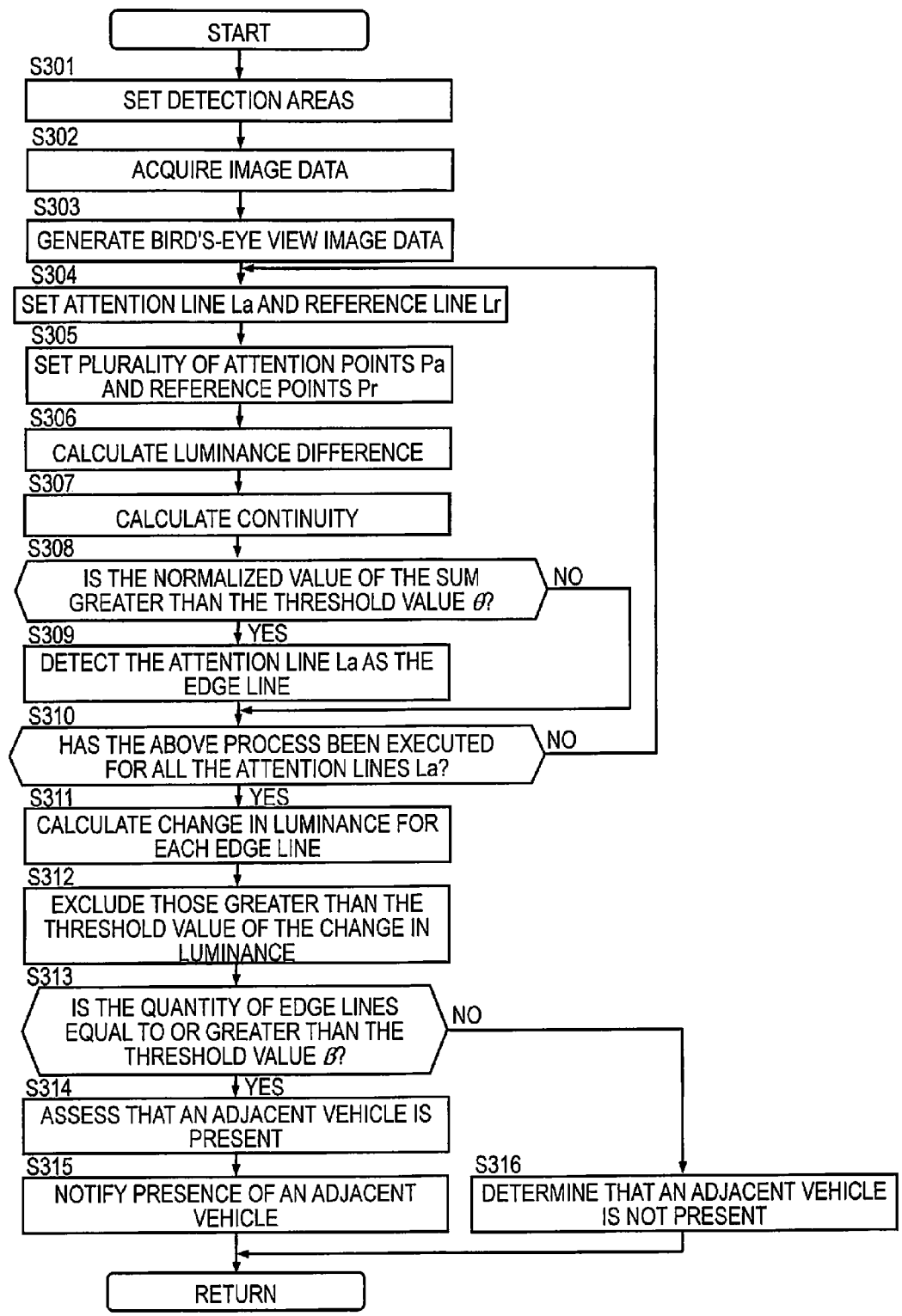
FIG. 22 is a flowchart illustrating the method for detecting an adjacent vehicle according to the second embodiment.

Next, the method for detecting an adjacent vehicle according to the second embodiment will be described. FIG. 22 is a flowchart illustrating the details of the method for detecting an adjacent vehicle according to the second embodiment. In FIG. 22, the process involved with detection area A1 will be described for the sake of convenience, but the same process is executed for the detection area A2 as well.

First, in step S301, detection areas A1, A2 for detecting the adjacent vehicle are set in the same manner as in step S101 of the first embodiment. In step S301, the detection areas set in the detection area setting process illustrated in FIG. 14 are set in the same manner as the first embodiment.

In step S302, a predetermined area specified by the view angle a and the attachment position is captured by the camera 10, and the image data of the captured image captured by the camera 10 is acquired by the computer 30a. Next, the viewpoint conversion unit 31 converts the viewpoint of the acquired image data and generates bird's-eye view image data in step S303.

Next, in step S304, the luminance difference calculation unit 35 sets the reference line Lr and the attention line La on the detection area A1. At this time, the luminance difference calculation unit 35 sets a line corresponding to a line extending in the perpendicular direction in real space as the attention line La, and sets, as the reference line Lr, a line that corresponds to a line extending in the perpendicular direction in real space and that is separated by a predetermined distance in real space from the attention line La.

Next, in step S305, the luminance difference calculation unit 35 sets a plurality of attention points on the attention line La, and sets reference points Pr so that the attention points Pa and the reference points Pr are at substantially the same height in real space. The attention points Pa and the reference points Pr thereby line up in substantially the horizontal direction, and the edge line extending in the perpendicular direction in real space is more readily detected. The luminance difference calculation unit 35 sets a certain number of attention points Pa that will not be problematic during edge detection by the edge line detection unit 36.

Next, in step S306, the luminance difference calculation unit 35 calculates the luminance difference between the attention points Pa and the reference points Pr at the same height in real space. The edge line detection unit 36 calculates the attribute s of the attention points Pa in accordance with formula 2 described above. In step S307, the edge line detection unit 36 then calculates the continuity c of the attribute s of the attention points Pa in accordance with formula 3. In step S308, the edge line detection unit 36 furthermore assesses whether a value obtained by normalizing the sum of the continuity c is greater than a threshold value G in accordance with formula 4. When it has been determined that the normalized value is greater than the threshold value θ (step S308=Yes), the edge line detection unit 36 detects the attention line La as the edge line in step S309. The process then proceeds to step S310. When it has been determined that the normalized value is not greater than the threshold value θ (step S308=No), the edge line detection unit 36 does not detect that the attention line La is an edge line, and the process proceeds to step S310.

In step S310, the computer 30a determines whether the processes of steps S304 to S310 have been executed for all the attention lines La that can be set on the detection area A1. When it has been determined that the above processes have not been carried out for all the attention lines La (step S310=No), the process returns to step S304, sets a new attention line La, and repeats the process through step S311.

On the other hand, when it has been determined that the processes have been carried out for all the attention lines La (step S310=Yes), the process proceeds to step S311.

In step S311, the three-dimensional object detection unit 33a calculates the change in luminance along the edge line for each edge line detected in step S309. The three-dimensional object detection unit 33a calculates the change in luminance of edge lines in accordance with any of formulas 5, 6, and 7. Next, in step S312, the three-dimensional object detection unit 33a excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33a determines an edge line having a change in luminance that is less than a predetermined threshold value tb to be an edge line of a three-dimensional object, and thereby detects the three-dimensional object present in an adjacent vehicle.

Next, in step S313, it is determined by the three-dimensional object detection unit 33a whether the quantity of edge lines is a threshold value β or higher. When is has been assessed that the quantity of edge lines is not at a threshold value β or higher (step S313=Yes), the three-dimensional object detection unit 33a assesses in step S314 that an adjacent vehicle is present in the detection area A1. In the subsequent step S315, the notification device 50 provides notification that an adjacent vehicle is present rearward of the host vehicle. On the other hand, when is has been assessed that the quantity of edge lines is not at a threshold value β or higher (step S313=No), the three-dimensional object detection unit 33a assesses in step S316 that an adjacent vehicle is not present in the detection area A1. The process illustrated in FIG. 22 is thereafter ended.

In the second embodiment, the detection area setting process illustrated in FIG. 14 is carried out in parallel to the adjacent vehicle detection process illustrated in FIG. 22, in the same manner as the first embodiment. The adjacent vehicle detection process illustrated in FIG. 22 is carried out in the detection areas set by the detection area setting process.

As described above, in the second embodiment, the captured image is converted to a bird's-eye view image, and edge information of the three-dimensional object is detected from the bird's-eye view image thus converted, and an adjacent vehicle present in an adjacent lane is thereby detected. Also, in the second embodiment, when it has been assessed that the adjacent vehicle has passed the host vehicle, the detection areas are widened rearward with respect to the direction of vehicle progress, in the same manner as the first embodiment, whereby, in addition to the effects of the first embodiment, it is thereby possible to suitably detect whether the second adjacent vehicle trailing the first adjacent vehicle has passed the host vehicle when two adjacent vehicles are traveling in consecutive fashion, even when an adjacent vehicle is detected based on edge information.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

Figure 23B:
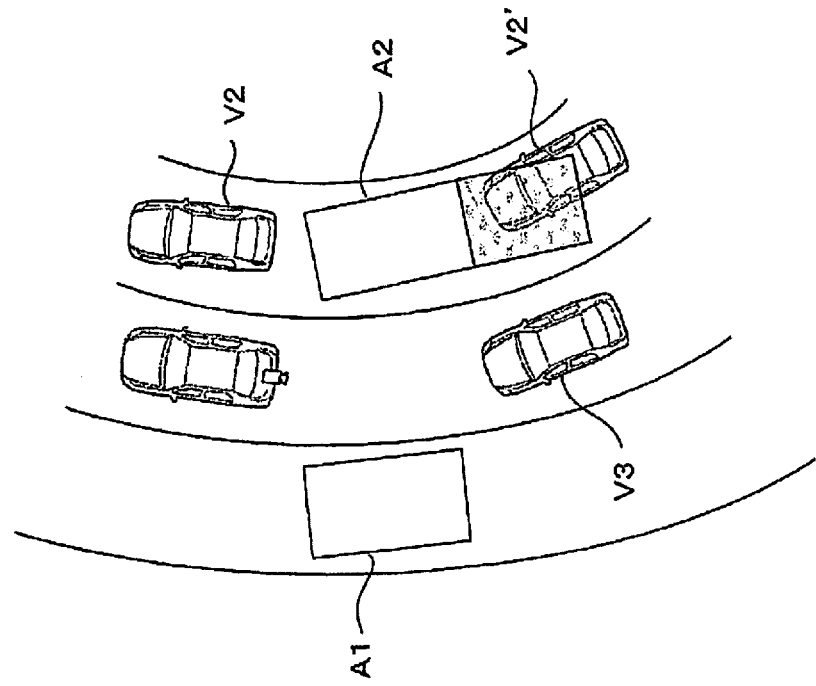
FIGS. 23A and 23B are views for describing another example of the method for setting the detection area when the host vehicle is turning.
Figure 23A:
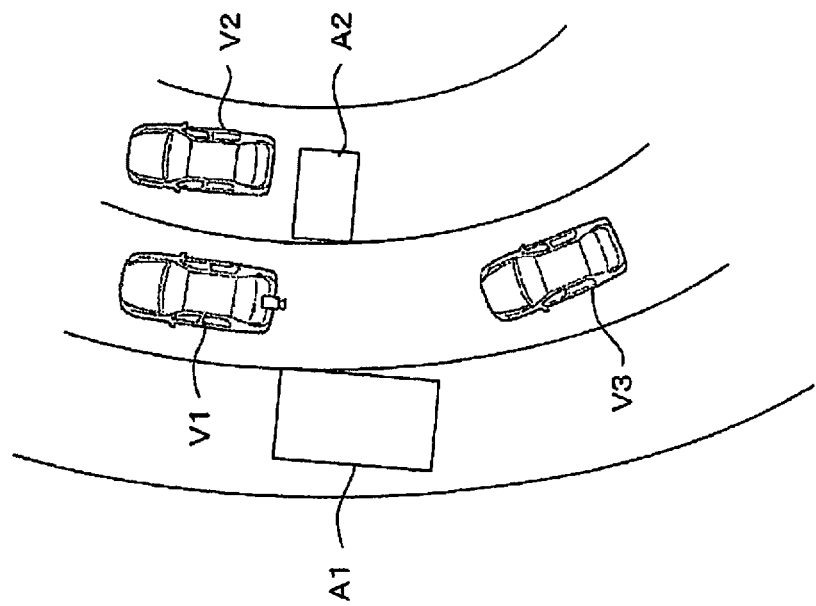

For example, in the embodiments described above, when the host vehicle V1 is turning, as illustrated in FIG. 12A, a configuration was given as an example in which the amount by which the detection area A2 is widened rearward is reduced so that the detection area does not enter the lane in which the host vehicle is traveling, but no limitation is imposed thereby, and it is also possible to used a configuration in which, e.g., the detection area A2 is not widened rearward, and the detection area A2 is conversely narrowed forward when the host vehicle V1 is turning, as illustrated in FIG. 23A, even when the first adjacent vehicle V2 is passing the host vehicle V1. In other words, it is possible to use a configuration in which the length of the detection area A2 set inside the turn in the direction of progress of the host vehicle V1 may be set to be less than the length of the detection area A1 set outside the turn in the direction of progress of the host vehicle V1 (the length set in advance when the host vehicle V1 is not being passed by the adjacent vehicle V2), as shown in FIG. 23A. It is also possible to use a configuration in which the detection areas A1, A2 are rotated and set so as to tilt into the turn direction in relation to the direction of progress of the host vehicle V1, as illustrated in FIG. 23B, so that the detection areas do not enter the lane in which the host vehicle is traveling. It is furthermore possible to use a configuration in which the detection areas are widened rearward of the host vehicle within a range in which a trailing adjacent vehicle V3 traveling in the lane in which the host vehicle is traveling is not detected, though the detection areas will enter the lane in which the host vehicle is traveling.

Also, in the embodiments described above, a configuration was given as an example in which the determination of whether the host vehicle is turning is made based on the road shape predicted from the captured image captured by the camera 10 or the steering angle detected by the steering angle sensor 40. However, no limitation is imposed by this configuration, and, for example, it is also possible to acquire the curvature radius of the curve in which the host vehicle is traveling from map information obtained by a navigation device, and thereby determine whether the host vehicle is turning. Also, it may be determined whether the host vehicle is turning, based on the yaw rate and speed of the host vehicle.

Furthermore, in the embodiments described above, a configuration was given as an example in which the detection areas are narrowed forward with respect to the direction of vehicle progress when a predetermined time has elapsed after the adjacent vehicle can no longer be detected in the detection areas. However, no limitation is imposed by this configuration, and it is also possible to use a configuration in which the detection areas are narrowed forward with respect to the direction of vehicle progress when the host vehicle has traveled a predetermined distance after an adjacent vehicle can no longer be detected in the detection areas. Also, in this case, it is possible to use a configuration in which the above-noted predetermined distance is modified based on the relative movement speed of the adjacent vehicle V2 in relation to the host vehicle V1. For example, the detection area setting unit 34 may be configured so as to predict that the relative movement speed of the second adjacent vehicle V2' is greater in commensurate fashion to a greater relative movement speed of the first adjacent vehicle V2 in relation to the host vehicle V1 and that the second adjacent vehicle will soon catch the host vehicle, and to increase the predetermined distance. Alternatively, it is possible to use a configuration in which it is determined that the time the adjacent vehicle stays rearward of the host vehicle is shorter in commensurate fashion to a greater relative movement speed of the first adjacent vehicle V2 in relation to the host vehicle V1, and to reduce the predetermined distance. It is furthermore possible to use a configuration in which consideration is given to the speed of the host vehicle and it is predicted that the second adjacent vehicle V2' will not soon catch the host vehicle when the speed of the host vehicle is sufficiently high and the distance between the first adjacent vehicle V2 and the second adjacent vehicle V2' is great, and the predetermined distance is not increased, even when, e.g., the relative movement speed of the first adjacent vehicle V2 in relation to the host vehicle V1 is high. In this manner, setting the predetermined distance in accordance with the travel state of the host vehicle allows the second adjacent vehicle V2' to be suitably detected.

In the embodiments described above, a configuration was given as an example in which the detection areas are widened rearward with respect to the direction of vehicle progress, but it is possible to use a configuration in which the detection areas are widened in a single step or the detection areas are gradually widened when the detection areas are to be widened rearward with respect to the direction of vehicle progress.

The camera 10 in the embodiments described above corresponds to the image capturing means of the present invention. The viewpoint conversion unit 31 corresponds to the image conversion means of the present invention, the alignment unit 32, the three-dimensional object detection unit 33, 33a, the luminance difference calculation unit 35, and the edge line detection unit 36 correspond to the three-dimensional object detection means of the present invention. The three-dimensional object detection unit 33, 33a corresponds to the relative movement speed calculation means of the present invention, and the detection area setting unit 34 corresponds to the detection area setting means and the turn behavior detection means of the present invention.

The invention claimed is:

1. A three-dimensional object detection device comprising:
   an image capturing unit arranged to capture images of an area rearward of a host vehicle equipped with the three-dimensional object detection device; and
   a computer that is programmed to include:
   a detection area setting unit programmed to set a predetermined detection area in a lateral direction rearward of the host vehicle;
   an image conversion unit programmed to convert a viewpoint of the image obtained by the image capturing unit to create bird's-eye view images;
   a three-dimensional object detection unit programmed to detect a presence of a three-dimensional object within the predetermined detection area by vehicle width direction detection processing in which the bird's-eye view images obtained at different times by the image conversion unit are aligned, programmed to form a frequency distribution by counting a number of pixels that indicate a predetermined difference in a difference image of the bird's-eye view images to form difference waveform information, wherein the pixels are counted along lines in a direction in which the three-dimensional object collapses, and programmed to detect the presence of the three-dimensional object within the predetermined detection area based on the difference waveform information, when a peak in the difference waveform information is determined to be at a threshold value or greater; and
   a relative movement speed calculation unit programmed to calculate a relative movement speed of the three-dimensional object based on the difference waveform information generated by the three-dimensional object detection unit, the relative movement speed being a speed of the three-dimensional object relative to a speed of the host vehicle,
   the detection area setting unit widening the predetermined detection area rearward with respect to a direction of vehicle progress when the three-dimensional object is detected in the predetermined detection area by the three-dimensional object detection unit and the relative movement speed of the three-dimensional object is at a predetermined value or greater.

2. A three-dimensional object detection device comprising:
   an image capturing unit arranged to capture images of an area rearward of a host vehicle equipped with the three-dimensional object detection device; and
   a computer that is programmed to include:
   a detection area setting unit programmed to set a predetermined detection area in a lateral direction rearward of the host vehicle;
   an image conversion unit programmed to convert a viewpoint of the image obtained by the image capturing unit means to create bird's-eye view images;
   a three-dimensional object detection unit programmed to detect a presence of a three-dimensional object within the predetermined detection area based on edge information from the bird's-eye view image images obtained by the image conversion means unit; and
   a relative movement speed calculation unit programmed to calculate a relative movement speed of the three-dimensional object based on the edge information detected by the three-dimensional object detection unit, the relative movement speed being a speed of the three-dimensional object relative to a speed of the host vehicle,
   the detection area setting unit widening the predetermined detection area rearward with respect to a direction of vehicle progress when the three-dimensional object has been detected in the predetermined detection area by the three-dimensional object detection unit and the relative movement speed of the three-dimensional object is a predetermined value or greater.

3. The three-dimensional object detection device according to claim 1, wherein
   the detection area setting unit widens the predetermined detection area rearward with respect to the direction of vehicle progress, and thereafter narrows the predetermined detection area forward with respect to the direction of vehicle progress, when the three-dimensional object is no longer detected.

4. The three-dimensional object detection device according to claim 3, wherein
   the detection area setting unit widens the predetermined detection area rearward with respect to the direction of vehicle progress, and thereafter does not narrow the predetermined detection area forward with respect to the direction of vehicle progress until a predetermined time elapses after the three-dimensional object is no longer detected.

5. The three-dimensional object detection device according to claim 4, wherein
the detection area setting unit sets the predetermined time to be shorter in correspondence with a higher relative movement speed of the three-dimensional object the host vehicle.

6. The three-dimensional object detection device according to claim 4, wherein
the detection area setting unit sets the predetermined time to be longer in correspondence with a higher relative movement speed of the three-dimensional object.

7. The three-dimensional object detection device according to claim 3, wherein
the detection area setting unit widens the predetermined detection area rearward with respect to the direction of vehicle progress, and thereafter does not narrow the predetermined detection area forward with respect to the direction of vehicle progress until the host vehicle has traveled a predetermined distance after the three-dimensional object is no longer detected.

8. The three-dimensional object detection device according to claim 7, wherein
the detection area setting unit sets the predetermined distance to be less in correspondence with a higher relative movement speed of the three-dimensional object.

9. The three-dimensional object detection device according to claim 7, wherein
the detection area setting unit sets the predetermined distance to be greater in correspondence with a higher relative movement speed of the three-dimensional object.

10. The three-dimensional object detection device according to claim 3, wherein
the detection area setting unit widens the predetermined detection area at a first speed when the predetermined detection area is to be widened rearward with respect to the direction of vehicle progress, and narrows the predetermined detection area at a second speed that is less than the first speed when the predetermined detection area is to be narrowed forward in the direction of progression of the host vehicle,
wherein the first speed corresponds to the relative movement speed of the three-dimensional object, and the second speed corresponds to a speed of the host vehicle.

11. The three-dimensional object detection device according to claim 1, wherein
the computer is further programmed to include a turn behavior detection unit programmed to detect turn behavior of the host vehicle,
the detection area setting unit determining whether the host vehicle is turning, based on the turn behavior of the host vehicle when the predetermined detection area is to be widened rearward with respect to the direction of vehicle progress, and reduces an amount by which the predetermined detection area is to be widened in the rearward direction in correspondence with a smaller turn radius of the host vehicle as determined from the turn behavior of the host vehicle when the host vehicle is determined to be turning.

12. A three-dimensional object detection device comprising:

an image capturing unit arranged to capture an image of an area rearward of a host vehicle equipped with the three-dimensional object detection device; and
a computer that is programmed to include:
a detection area setting unit programmed to set a predetermined detection area in a lateral direction rearward of the host vehicle;
an image conversion unit programmed to convert a viewpoint of the image obtained by the image capturing unit to create a bird's-eye view image;
a three-dimensional object detection unit programmed to detect a presence of a three-dimensional object within the predetermined detection area in the bird's-eye view image obtained by the image conversion unit based on pixel distribution information in which a luminance difference is at a predetermined threshold value or greater along a direction in which the three-dimensional object collapses when the viewpoint is converted to the bird's-eye view image; and
a relative movement speed calculation unit programmed to calculate a relative movement speed of the three-dimensional object based on a change in time of the pixel distribution information, the relative movement speed being a speed of the three-dimensional object relative to a speed of the host vehicle,
the detection area setting unit widening the predetermined detection area rearward with respect to a direction of vehicle progress when the three-dimensional object has been detected in the predetermined detection area by the three-dimensional object detection unit and the relative movement speed of the three-dimensional object is a predetermined value or greater.

13. The three-dimensional object detection device according to claim 2, wherein
the detection area setting unit widens the predetermined detection area rearward with respect to the direction of vehicle progress, and thereafter narrows the predetermined detection area forward with respect to the direction of vehicle progress, when the three-dimensional object is no longer detected.

14. The three-dimensional object detection device according to claim 13, wherein
the detection area setting unit widens the predetermined detection area rearward with respect to the direction of vehicle progress, and thereafter does not narrow the predetermined detection area forward with respect to the direction of vehicle progress until a predetermined time elapses after the three-dimensional object is no longer detected.

15. The three-dimensional object detection device according to claim 14, wherein
the detection area setting unit sets the predetermined time to be shorter in correspondence with a higher relative movement speed of the three-dimensional object.

16. The three-dimensional object detection device according to claim 14, wherein
the detection area setting unit sets the predetermined time to be longer in correspondence with a higher relative movement speed of the three-dimensional object.

17. The three-dimensional object detection device according to claim 13, wherein
the detection area setting unit widens the predetermined detection area rearward with respect to the direction of vehicle progress, and thereafter does not narrow the predetermined detection area forward with respect to the direction of vehicle progress until the host vehicle has traveled a predetermined distance after the three-dimensional object is no longer detected.

18. The three-dimensional object detection device according to claim 17, wherein
the detection area setting unit sets the predetermined distance to be less in correspondence with a higher relative movement speed of the three-dimensional object.

19. The three-dimensional object detection device according to claim 17, wherein
the detection area setting unit sets the predetermined distance to be greater in correspondence with a higher relative movement speed of the three-dimensional object.

20. The three-dimensional object detection device according to claim 13, wherein
the detection area setting unit widens the predetermined detection area at a first speed when the predetermined detection area is to be widened rearward with respect to the direction of vehicle progress, and narrows the predetermined detection area at a second speed that is less than the first speed when the predetermined detection area is to be narrowed forward in the direction of progression of the host vehicle,
wherein the first speed corresponds to the relative movement speed of the three-dimensional object, and the second speed corresponds to a speed of the host vehicle.

21. The three-dimensional object detection device according to claim 2, wherein
the computer is further programmed to include a turn behavior detection unit programmed to detect turn behavior of the host vehicle,
the detection area setting unit determining whether the host vehicle is turning, based on the turn behavior of the host vehicle when the predetermined detection area is to be widened rearward with respect to the direction of vehicle progress, and reduces an amount by which the predetermined detection area is to be widened in the rearward direction in correspondence with a smaller turn radius of the host vehicle as determined from the turn behavior of the host vehicle when the host vehicle is determined to be turning.

22. A three-dimensional object detection device comprising:
an image capturing unit arranged to capture images of an area rearward of a host vehicle equipped with the three-dimensional object detection device; and
a computer that is programmed to include:
a detection area setting unit programmed to set a predetermined detection area in a lateral direction rearward of the host vehicle;
an image conversion unit programmed to convert a viewpoint of the image obtained by the image capturing unit to create bird's-eye view images;
a three-dimensional object detection unit programmed to detect a presence of a three-dimensional object within the predetermined detection area by vehicle width direction detection processing in which the bird's-eye view images obtained at different times by the image conversion unit are aligned, programmed to form a frequency distribution by counting a number of pixels that indicate a predetermined difference in a difference image of the bird's-eye view images to form difference waveform information, wherein the pixels are counted along lines in a direction in which the three-dimensional object collapses, and programmed to detect the presence of the three-dimensional object within the predetermined detection area based on the difference waveform information, when a peak in the difference waveform information is determined to be at a threshold value or greater; and
a relative movement speed calculation unit programmed to calculate a relative movement speed of the three-dimensional object in relation to the host vehicle based on the difference waveform information generated by the three-dimensional object detection unit,
the detection area setting unit widening the predetermined detection area rearward with respect to a direction of vehicle progress when the three-dimensional object is detected in the predetermined detection area by the three-dimensional object detection unit and the relative movement speed of the three-dimensional object is at a predetermined value or greater,
the detection area setting unit widening the predetermined detection area rearward with respect to the direction of vehicle progress, and thereafter narrowing the predetermined detection area forward with respect to the direction of vehicle progress, when a predetermined time elapses after the three-dimensional object is no longer detected,
the detection area setting unit widening the predetermined detection area rearward with respect to the direction of vehicle progress, and thereafter not narrowing the predetermined detection area forward with respect to the direction of vehicle progress until the predetermined time elapses after the three-dimensional object is no longer detected.

23. A three-dimensional object detection device comprising:
an image capturing unit arranged to capture images of an area rearward of a host vehicle equipped with the three-dimensional object detection device; and
a computer that is programmed to include:
a detection area setting unit programmed to set a predetermined detection area in a lateral direction rearward of the host vehicle;
an image conversion unit programmed to convert a viewpoint of the image obtained by the image capturing unit means to create bird's-eye view images;
a three-dimensional object detection unit programmed to detect a presence of a three-dimensional object within the predetermined detection area based on edge information from the bird's-eye view image images obtained by the image conversion means unit; and
a relative movement speed calculation unit programmed to calculate a relative movement speed of the three-dimensional object in relation to the host vehicle based on the edge information detected by the three-dimensional object detection unit,
the detection area setting unit widening the predetermined detection area rearward with respect to a direction of vehicle progress when the three-dimensional object has been detected in the predetermined detection area by the three-dimensional object detection unit and the relative movement speed of the three-dimensional object is a predetermined value or greater,
the detection area setting unit widening the predetermined detection area rearward with respect to the direction of vehicle progress, and thereafter narrowing the predetermined detection area forward with respect to the direction of vehicle progress, when a predetermined time elapses after the three-dimensional object is no longer detected, the detection area setting unit widening the predetermined detection area rearward with respect to the direction of vehicle progress, and thereafter not narrowing the predetermined detection area forward with respect to the direction of vehicle progress until the predetermined time elapses after the three-dimensional object is no longer detected.

24. A three-dimensional object detection device comprising:

an image capturing unit arranged to capture an image of an area rearward of a host vehicle equipped with the three-dimensional object detection device; and a computer that is programmed to include:
- a detection area setting unit programmed to set a predetermined detection area in a lateral direction rearward of the host vehicle;
- an image conversion unit programmed to convert a viewpoint of the image obtained by the image capturing unit to create a bird's-eye view image;
- a three-dimensional object detection unit programmed to detect a presence of a three-dimensional object within the predetermined detection area in the bird's-eye view image obtained by the image conversion unit based on pixel distribution information in which a luminance difference is at a predetermined threshold value or greater along a direction in which the three-dimensional object collapses when the viewpoint is converted to the bird's-eye view image; and
- a relative movement speed calculation unit programmed to calculate a relative movement speed of the three-dimensional object in relation to the host vehicle based on a change in time of the pixel distribution information, the detection area setting unit widening the predetermined detection area rearward with respect to a direction of vehicle progress when the three-dimensional object has been detected in the predetermined detection area by the three-dimensional object detection unit and the relative movement speed of the three-dimensional object is a predetermined value or greater, the detection area setting unit widening the predetermined detection area rearward with respect to the direction of vehicle progress, and thereafter narrowing the predetermined detection area forward with respect to the direction of vehicle progress, when a predetermined time elapses after the three-dimensional object is no longer detected, the detection area setting unit widening the predetermined detection area rearward with respect to the direction of vehicle progress, and thereafter not narrowing the predetermined detection area forward with respect to the direction of vehicle progress until the predetermined time elapses after the three-dimensional object is no longer detected.

* * * * *